United States Patent
Shibatani

(10) Patent No.: US 7,208,905 B2
(45) Date of Patent: Apr. 24, 2007

(54) DRIVING METHOD, DRIVING MECHANISM, AND IMAGE CAPTURING APPARATUS

(75) Inventor: Kazuhiro Shibatani, Sakai (JP)

(73) Assignee: Konica Minolta Photo Imaging, Inc., Tokyo (JP)

(*) Notice: Subject to any disclaimer, the term of this patent is extended or adjusted under 35 U.S.C. 154(b) by 0 days.

(21) Appl. No.: 11/257,934

(22) Filed: Oct. 25, 2005

(65) Prior Publication Data

US 2006/0091844 A1 May 4, 2006

(30) Foreign Application Priority Data

Oct. 28, 2004 (JP) ............... 2004-313683

(51) Int. Cl.
*H02P 8/00* (2006.01)
(52) U.S. Cl. ............... 318/696; 318/685; 396/52; 396/55; 348/208.99
(58) Field of Classification Search ........... 318/696, 318/685; 396/52, 55; 348/208.99
See application file for complete search history.

(56) References Cited

U.S. PATENT DOCUMENTS 5,309,190 A * 5/1994 Shinohara et al. ........ 396/55
5,850,575 A * 12/1998 Ohishi ..................... 396/52
6,141,498 A * 10/2000 Hara ....................... 396/55
6,208,377 B1* 3/2001 Morofuji et al. ......... 348/208.8
6,233,009 B1* 5/2001 Morofuji et al. ......... 348/208.8

FOREIGN PATENT DOCUMENTS

JP 11-41989 2/1999
JP 2000-093846 4/2000

* cited by examiner

*Primary Examiner*—Rita Leykin
(74) *Attorney, Agent, or Firm*—Brinks Hofer Gilson & Lione

(57) ABSTRACT

The driving method of the present invention is a driving method to drive a stepping motor driven by a predetermined driving pulse, by the servo driving method, and is characterized in that a predetermined sampling period is set, and the generation condition of the driving pulse to drive the stepping motor is set at the sampling periods. Thereby, the stepping motor can be driven while the most suitable driving condition is determined at the predetermined sampling periods. That is, since the driving condition of the stepping motor can be changed at the sampling periods, even when the stepping motor driven by the driving pulse is the driving source, appropriate servo control can be realized.

10 Claims, 16 Drawing Sheets

Fig. 2
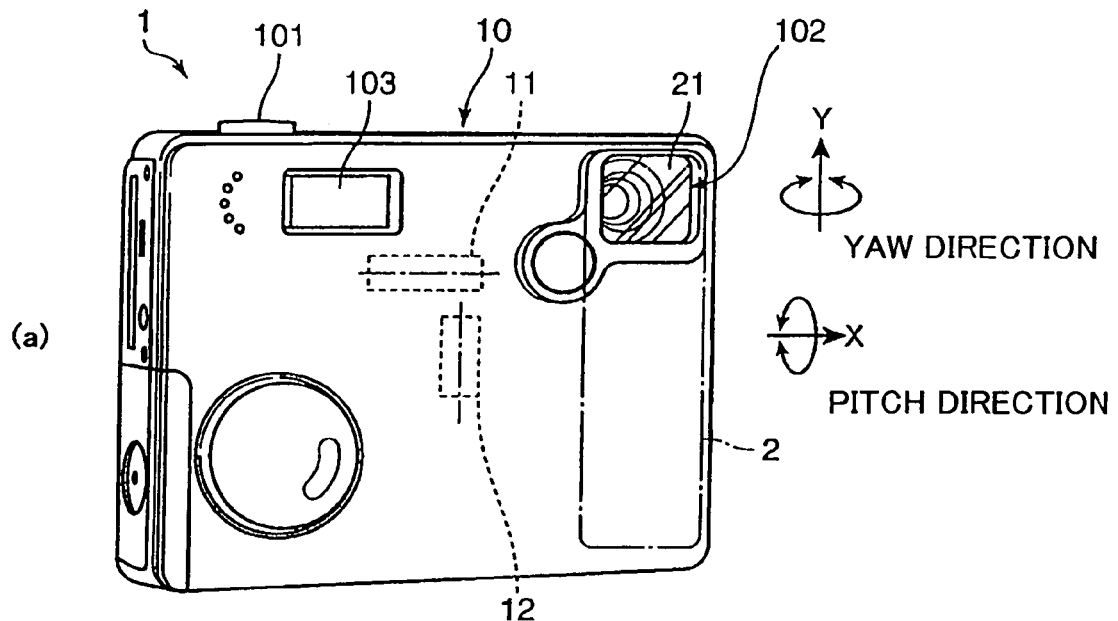
(a)
YAW DIRECTION
PITCH DIRECTION
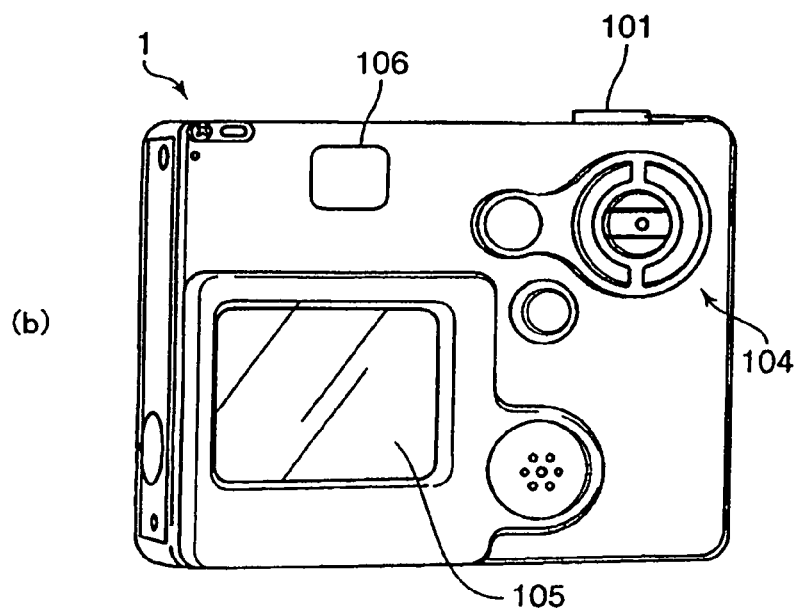
(b)

DRIVING METHOD, DRIVING MECHANISM, AND IMAGE CAPTURING APPARATUS

This application is based on Japanese Patent Application No. 2004-313683 filed in Japan on 28 Oct. 2004, the entire content of which is hereby incorporated by reference.

FIELD OF THE INVENTION

The present invention relates to a driving method to drive a stepping motor by a servo control method, a driving mechanism having a stepping motor, and an image capturing apparatus having such a driving mechanism.

DESCRIPTION OF RELATED ART

A stepping motor driven by a predetermined driving pulse is generally used as the driving sources of various driving mechanisms. Since the driving status of the stepping motor can be grasped by counting the number of inputted driving pulses, an advantage is obtained that feedback control or the like is unnecessary and driving can be performed by so-called open loop control whose control structure is simple. As a method of driving such a stepping motor, for example, Japanese Laid-Open Patent Application No. H11-41989 discloses a driving method in which speed control is performed by supplying the stepping motor with a clock pulse corresponding to the desired rotation speed.

On the other hand, as a driving control method of various driving mechanisms, the servo control method is generally used in which a control target value is set and driving control is performed so as to follow a given change of the control target value. Japanese Laid-Open Patent Application No. 2000-93846 discloses an art related to driving the stepping motor by the servo control (open loop control) method in the use of centrifugal concentrators.

In recent years, in digital cameras and the like, a hand shake compensation mechanism that shakes the image capturing system (the lens barrel, the image sensor, etc.) in response to a hand shake or the like has been increasingly provided. As the driving mechanism for such a hand shake compensation mechanism, a mechanism is generally used that drives an actuator using a moving coil, a piezoelectric element and the like by so-called closed loop servo control involving feedback control. That is, a hand shake compensation mechanism using a stepping motor capable of open loop control has not been proposed yet, and although the patent document 2 discloses an open loop control method, it has not yet been known how the open loop control should be applied to a mechanism such as the hand shake compensation mechanism where the target position changes from moment to moment, to perform suitable driving control.

SUMMARY OF THE INVENTION

The present invention is made in view of the above-mentioned circumstances, and an object thereof is to provide a driving method and a driving mechanism in which in a driving mechanism (method) of the servo control method, a stepping motor capable of being driven by the open loop control whose control structure can be simplified is selected as the driving source and when this is used as the driving mechanism or the like, for example, in a hand shake compensation mechanism, adequate control can be performed, and an image capturing apparatus using same.

The above-mentioned object can be attained by providing the following structure:

A driving method of the present invention is a driving method to drive a stepping motor driven by a predetermined driving pulse, by the servo control method, and is characterized in that a predetermined sampling period is set and the generation condition of the driving pulse to drive the stepping motor is set at the sampling periods.

According to this method, since the driving pulse generation condition is set at the predetermined sampling periods, the driving pulse generation condition is reset at the sampling periods, and the stepping motor driving condition can be newly set. Consequently, in performing the servo control, the stepping motor can be driven while the most suitable driving condition is determined at the predetermined sampling periods.

In the above-described driving method, it is preferable that control target information be obtained at the sampling periods and the setting of the generation condition of the driving pulse to drive the stepping motor be performed at the sampling periods. According to this method, since the setting of the driving pulse generation condition according to the obtained control target information is performed at the sampling periods, servo control capable of accurately following a given change of the target value can be realized.

In the above-described driving method, the control target information may be the position information of the object to be driven by the stepping motor. According to this method, servo control capable of accurately following a given change of the target value can be realized. Consequently, when the above-described driving method is adopted as the driving method for the hand shake compensation function, for example, in a digital camera having a hand shake compensation function, driving can be appropriately performed according to the displacement of the shake amount (position information).

FIG. 1 is a block diagram schematically showing such a driving method. A stepping motor 3 is driven by the servo control method to cause the current value (output value) to follow the target value, and is driven by the open loop control where the driving status (current value information) is grasped by counting the number of inputted driving pulses. A driving pulse generation controller 4 sets the generation condition of the driving pulse to drive the stepping motor 3.

In such a structure, predetermined sampling periods t1 to t5 are set for an arbitrarily displacing target value (for example, the position information of the object to be driven). Then, the driving pulse generation controller 4 obtains the control target information at the sampling periods t1 to t5, and according to the control target information, resets the driving-pulse generation condition and sets a new driving pulse generation condition at the sampling periods t1 to t5. That is, at the sampling period t1, the driving pulse generation condition set in a sampling interval S20 up to that time is reset irrespective of whether the target position is reached or not, and a new driving pulse generation condition in the next sampling interval S1 is set. Thereafter, similar operations are performed at the sampling periods t2 to t5. Consequently, the driving condition of the stepping motor 3 can be set as appropriate according to the displacement of the target value at the sampling periods t1 to t5, so that the servo control to cause the current value to follow the target value can be accurately performed.

The sampling periods t1 to t5 are set as appropriate according to the desired driving speed and resolution and the performance of the stepping motor. The driving pulse generation condition set at the sampling periods t1 to t5 includes the number of driving pulses generated in each of the sampling intervals S1 to S5 and the pulse rate. In the present invention, the closed loop control is not excluded; in this case, a position detection sensor or the like is separately provided, and the current value information for comparison with the control target information is obtained from the position detection sensor or the like at the sampling periods t1 to t5.

A driving mechanism of the present invention is a driving mechanism provided with a stepping motor driven by a predetermined driving pulse and a driving pulse generation controller that controls the generation condition of the driving pulse, and is characterized in that a predetermined sampling period is set in the driving pulse generation controller and that at the sampling periods, the driving pulse generation controller resets the driving pulse generation condition up to that time and performs a calculation to determine the driving pulse generation condition in the sampling interval up to the next sampling period.

According to this structure, by the driving pulse generation controller, the driving pulse generation condition is rest at the set sampling periods irrespective of whether the target position is reached or not and the driving pulse generation condition in the sampling interval up to the next sampling period is set, and a new stepping motor driving condition is set. Consequently, in performing the servo control, the stepping motor can be driven while the most suitable driving condition is set by the driving pulse generation controller at the predetermined sampling periods.

In the above-described structure, it is preferable that a control information setter that sets the control target information of the stepping motor be provided and the driving pulse generation controller obtain the control target information from the control information setter at the sampling periods and perform the calculation to determine the driving pulse generation condition in the sampling interval according to the obtained control target information. According to this structure, the driving pulse generation controller compares the obtained control target information with the current value information of the stepping motor and the calculation to determine the most suitable driving pulse generation condition can be performed based on the comparison value information, so that servo control capable of accurately following a given change of the target value can be realized.

In this case, a structure may be adopted such that the control target information set by the control information setter is the position information of the object to be driven by the stepping motor and the driving pulse generation controller controls the movement distance, per unit time, of the object to be driven. According to this structure, the servo control to cause the position of the object to be driven to follow the target position can be accurately performed by use of the stepping motor. That is, since the movement distance per unit time is controlled by the driving pulse generation controller, servo control capable of accurately following a given change of the object to be driven can be realized. Consequently, when the above-described driving mechanism is adopted as the driving mechanism in the hand shake compensation function, for example, in a digital camera having the hand shake compensation function, shaking can be performed while the movement distance of the lens barrel or the image sensor are accurately controlled according to the displacement of the shake amount (position information).

Moreover, in the above-described structure, it is preferable that a wait time setter that enables the generation interval of the driving pulse to be set to a predetermined interval be provided and the wait time setter set the generation interval between the driving pulse generated last in a first sampling interval and the driving pulse generated first in a second sampling interval succeeding the first sampling interval to a predetermined wait time.

When the period of the driving pulse supplied to the stepping motor is shorter than a predetermined period, the rotor cannot catch up with the period of the driving pulse, so that a loss of synchronization occurs where the rotor and the stator are misaligned and the motor does not rotate normally. In a case where the driving pulse generation condition is set at predetermined sampling periods like the present invention, the generation interval between the driving pulse generated last in the first sampling interval and the driving pulse generated first in the succeeding second sampling interval is decreased, and when only the interval therebetween is grasped, there can be cases where a condition arises in which it seems as if the period of the driving pulse was set to a period shorter than the predetermined period. When such a condition arises, there is a possibility of a loss of synchronization, and particularly, when the open loop control is adopted, recovery to the normal driving condition is difficult. Therefore, by setting the predetermined wait time by the wait time setter, the interval between the driving pulse generated last in the first sampling period and the driving pulse generated first in the succeeding second sampling period is prevented from being abnormally short, thereby deterring the occurrence of a loss of synchronization.

In this structure, it is preferable that the calculation to determine the driving pulse generation condition by the driving pulse generation controller be performed within the wait time. According to this structure, since the calculation to determine the driving pulse generation condition is performed by utilizing the wait time, the calculation time is the wait time, so that the sampling period can be substantially reduced.

Moreover, in the above-described structure, a structure may be adopted such that the sampling period is fixed and the driving pulse generation controller obtains the number of driving pulses generated in each sampling interval by calculation and outputs the calculated number. According to this structure, the driving status (driving speed) of the stepping motor can be controlled based on the number of driving pulses generated in each sampling interval.

Moreover, in the above-described structure, a structure may be adopted such that the sampling period is fixed, the pulse rate of the driving pulse is fixed and the driving pulse generation controller can set the driving speed and the driving resolution by setting the upper and lower limits of the number of driving pulses generated in each sampling interval. According to this structure, the maximum driving speed is determined by the upper limit of the number of driving pulses, and the driving resolution is determined by the lower limit of the number of driving pulses. Consequently, by setting the upper and lower limits of the number of driving pulses according to the desired maximum speed and positioning resolution, the servo control of the stepping motor can be performed at the sampling periods at an appropriate speed and resolution according to the control target information.

Moreover, in the above-described structure, it is preferable that when the object to be driven by the driving mechanism is approximated to a first-order lag system and has a natural break frequency f0, the sampling period be set to a short period of not more than 1/f0. Generally, the driving speed of the stepping motor is changed when the pulse rate of the driving pulse is changed. For example, when the driving pulse rate is increased, the speed is increased. However, when the sampling period is set to a short period of not more than 1/f0 like this structure, that is, when the sampling period is set to a period of not more than the response speed of the object to be driven, the speed is changed based on the number of driving pulses generated in the sampling interval without any dependence on the pulse rate. Consequently, naturally, the speed and the resolution can be controlled based only on the number of driving pulses generated in each sampling interval, so that the execution of the servo control is facilitated.

Moreover, another image capturing apparatus of the present invention is an image capturing apparatus provided with image capturing means for performing image capturing of the subject and shake compensating means for performing mechanical shake compensation in the image capturing by the image capturing means, and is characterized in that a driving mechanism having a servo-controlled stepping motor is provided. According to this structure, the size and the cost of the shake compensating means (image capturing apparatus) can be reduced by capitalizing on various advantages of the stepping motor, that is, an advantage that since the open loop control is possible, the position sensor and the feedback control system are unnecessary and the control structure can be simplified.

Further, an image capturing apparatus of the present invention is an image capturing apparatus provided with image capturing means for performing image capturing of the subject, shake compensating means having a predetermined driving mechanism and performing mechanical shake compensation in the image capturing by the image capturing means, and a control target position calculator that calculates a driving target position by the shake compensating means based on the shake amount detected by predetermined shake detecting means, and a structure may be adopted such that the driving mechanism of the shake compensating means is provided with a stepping motor driven by a predetermined driving pulse and a driving pulse generation controller that controls the generation condition of the driving pulse, a predetermined sampling period is set in the driving pulse generation controller and at the sampling periods, and the driving pulse generation controller resets the driving pulse generation condition up to that time, obtains the control target position information from the control target position calculator and performs the calculation to determine the driving pulse generation condition in the sampling interval up to the next sampling period. According to this structure, with the hand shake compensation value or the like obtained by the control target position calculator as the target value, the servo control to perform the following shaking of the lens barrel, the image sensor and the like is performed by the driving mechanism having the stepping motor.

In the above-described structure, it is preferable that when the natural break frequency when the image capturing apparatus body is approximated to a first-order lag system is f0, the sampling period be set to a short period of not more than 1/f0. According to this structure, since the sampling period is set to a period of not more than the response speed of the image capturing apparatus body, naturally, the speed and the resolution can be controlled based only on the number of driving pulses generated in each sampling interval, so that the execution of the servo control is facilitated.

BRIEF DESCRIPTION OF THE DRAWINGS

These and other objects and features of the present invention will become clear from the following description taken in conjunction with the preferred embodiments thereof with reference to the accompanying drawings, in which:

FIGS. 2(a) and 2(b) are views showing the appearance of a digital camera according to an embodiment of the present invention, FIG. 2(a) being a front view thereof, FIG. 2(b) being a rear view thereof;

DETAILED DESCRIPTION OF THE PREFERRED EMBODIMENTS

Figure 1:
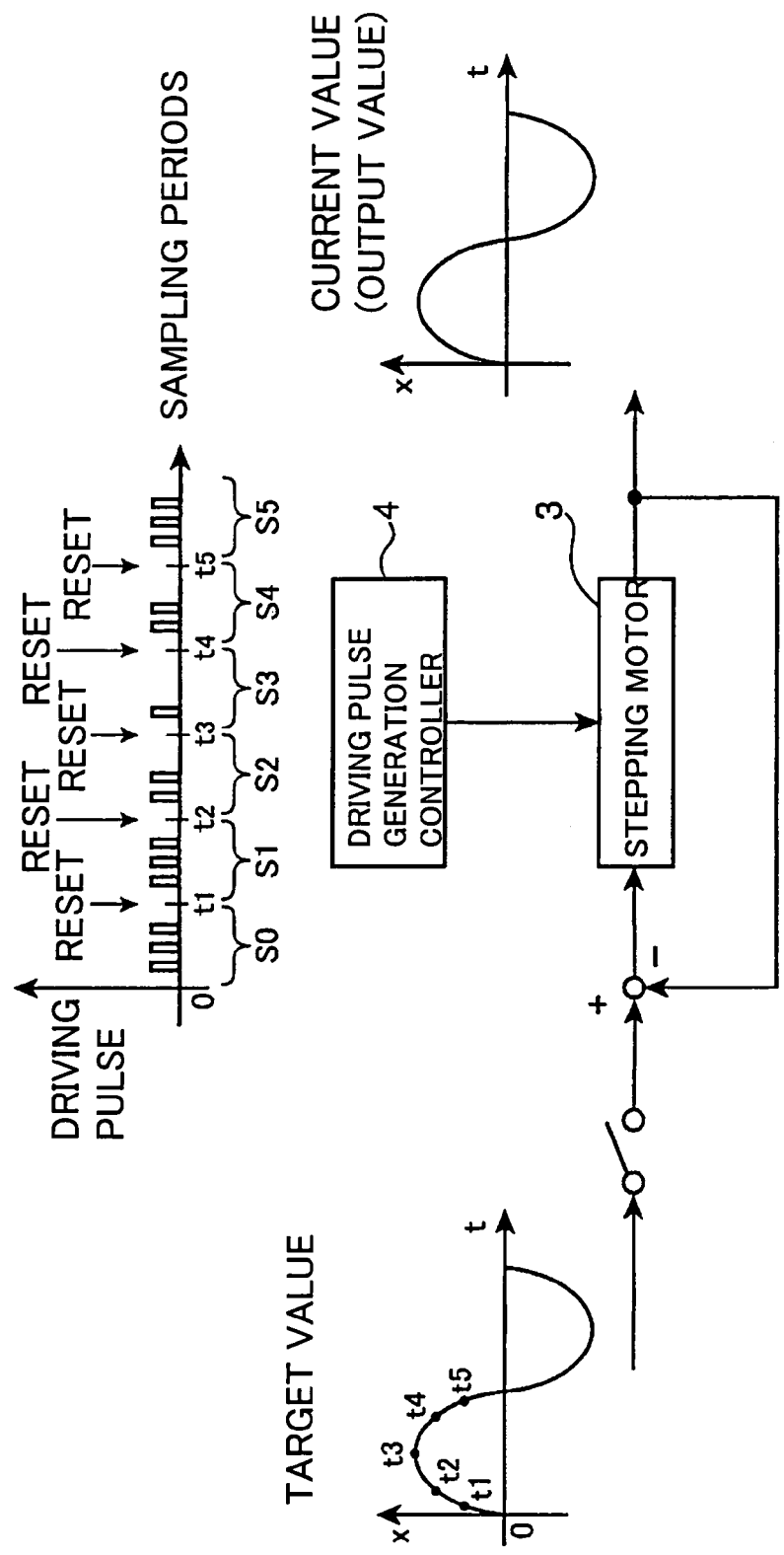
FIG. 1 is a block diagram schematically showing a driving method according to the present invention.

Hereinafter, with reference to the drawings, a lens barrel incorporating digital camera (image capturing apparatus) to which a driving mechanism (driving method) according to the present invention is applied will be shown, and a concrete embodiment will be described in detail.

(Description of the Camera Structure)

FIGS. 2(a) and 2(b) are views showing the appearance of a digital camera 1 according to the present embodiment. FIG. 2(a) is a front view thereof, and FIG. 2(b) is a rear view thereof. In the lens barrel incorporating digital camera 1, a release button 101 and the like are disposed on the top surface of a camera body 10, a photographing window 102, a flash 103 and the like are disposed on the front surface, and various operation buttons 104, a display 105 comprising a liquid crystal monitor (LCD) or the like, a viewfinder 106 and the like are disposed on the rear surface.

In the camera body 10, a bent-type lens barrel 2 is incorporated that constitutes a taking lens system for capturing a subject image from an objective lens 21 through the photographing window 102 and directing the subject image to a solid-state image sensor disposed within the camera body 10. The bent-type lens barrel 2 never changes in length even in zooming or focusing driving, that is, never protrudes outward from the camera body 10, and the solid-state image sensor is integrally provided on the image surface side thereof. Further, in the camera body 10, a pitch (P) shake detection gyro 11 and a yaw (Ya) shake detection gyro 12 as shake detecting means for detecting a shake supplied to the camera 1 are incorporated. Here, with the horizontal direction (direction of the width) of the camera 1 as the X axis direction and the vertical direction (direction of the height) of the camera 1 as the Y axis direction, the direction of rotation around the X axis will be referred to as a pitch (P) direction, and the direction of rotation around the Y axis, as a yaw (Ya) direction.

The bent-type lens barrel 2 has a tubular shape longitudinally incorporated in the camera body 10 (it is to be noted that it may be laterally incorporated), and is provided with shake compensating means having a driving mechanism that shakes the lens barrel 2. When a shake of the camera body 10 is detected by the pitch shake detection gyro 11 and the yaw shake detection gyro 12, the lens barrel 2 is shaken in the pitch and yaw directions by the shake compensating means so that the shake is canceled out.

Figure 3:
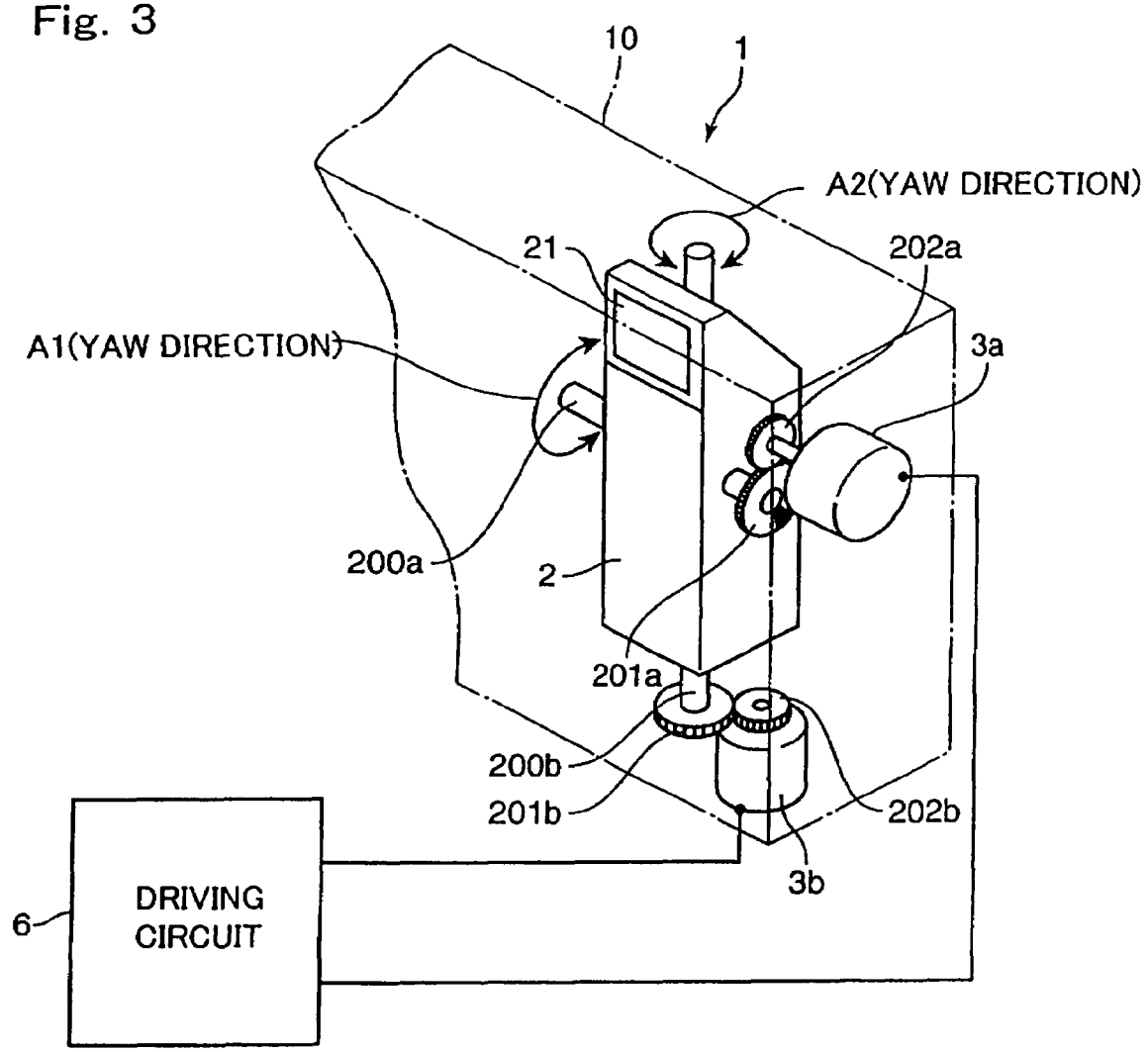
FIG. 3 is a perspective view schematically showing an example of a shake driving mechanism of a lens barrel.

FIG. 3 is a perspective view schematically showing an example of the shake driving mechanism of such a lens barrel 2. The lens barrel 2 is held by supporting means having a support point supporting the lens barrel 2 so as to be shakable. In the example shown in FIG. 3, the lens barrel 2 is supported by a first rotation shaft 200a that enables the lens barrel 2 to rotate (shake) in a first direction shown by the arrow A1 in the figure and its bearing (not shown) and a second rotation shaft 200b that enables the lens barrel 2 to rotate in a second direction shown by the arrow A2 in the figure and its bearing. It is necessary for this supporting means only to be capable of shaking the lens barrel 2 at least in two axis directions, and the support configuration and the number of support points are not specifically limited. Therefore, various support configurations may be adopted such as supporting the lens barrel 2 so as to be shakable by use of one or a plurality of ball bearings and supporting the lens barrel 2 at multiple points by an elastic member such as a coil spring.

The shake drivings of the lens barrel 2 in the pitch and yaw directions are performed by a pitch direction motor 3a and a yaw direction motor 3b each comprising a stepping motor driven by a predetermined driving circuit (driver), respectively. The pitch direction motor 3a and the yaw direction motor 3b are driven by the servo control method as described later in detail.

A mechanism to transmit the driving force from the pitch direction motor 3a and the yaw direction motor 3b to the lens barrel 2 can be set as appropriate. In the example shown in FIG. 3, a gear 201a fixed to the first rotation shaft 200a is meshed with a gear 202a fixed to the rotation shaft of the pitch direction motor 3a to thereby rotate the lens barrel 2 around the first rotation shaft 200a in the direction of the arrow A1 in the camera body 10, and a gear 201b fixed to the second rotation shaft 200b is meshed with a gear 202b fixed to the rotation shaft of the yaw direction motor 3b to thereby rotate the lens barrel 2 around the second rotation shaft 200b. While the position of the stepping motor can be grasped by the integration value of the inputted driving pulse (open loop control), when closed loop control is daringly performed, a position sensor or the like for detecting the home position of the lens barrel 2 is provided.

Figure 4:
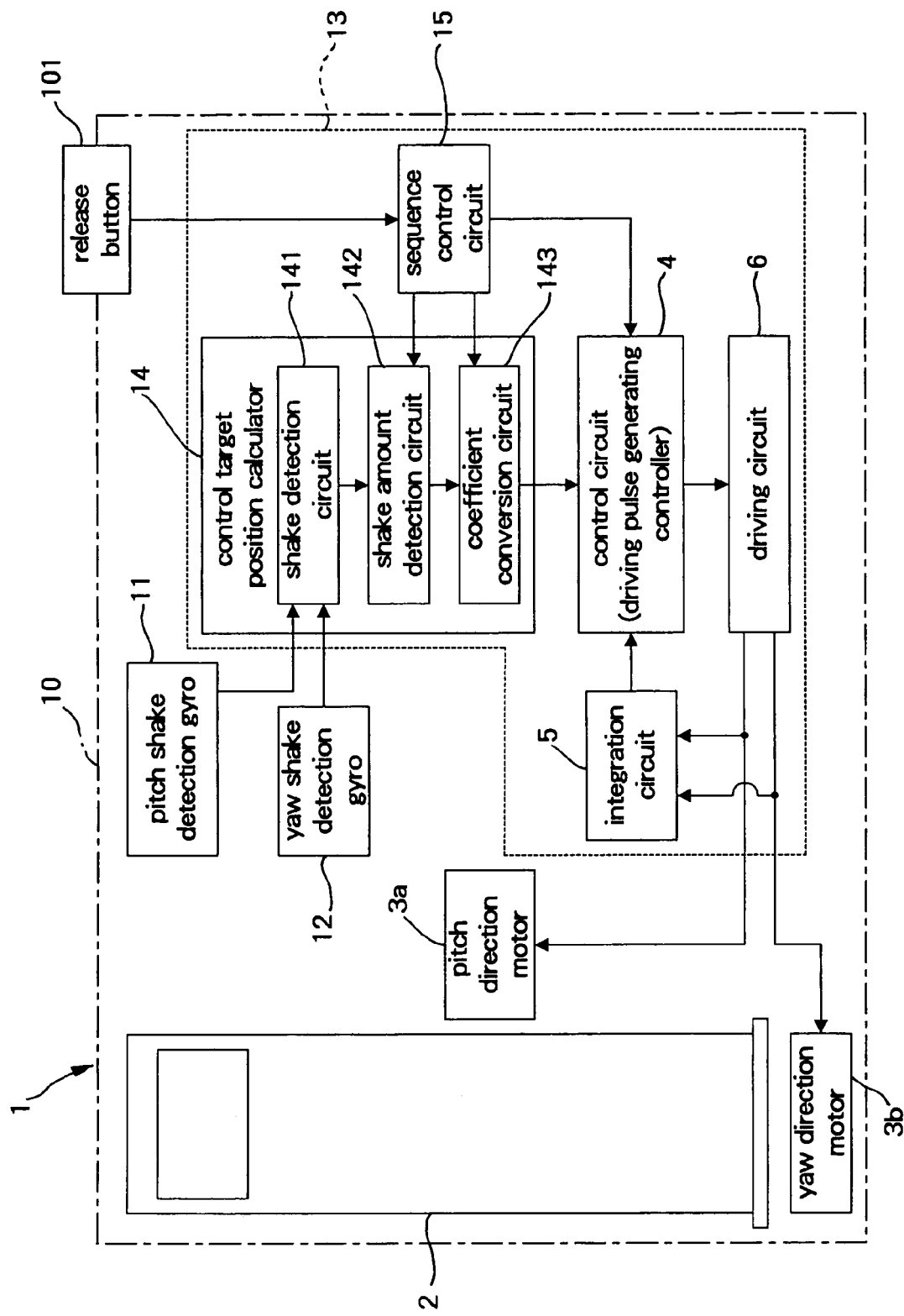
FIG. 4 is a block diagram schematically showing the structure of the digital camera according to the embodiment only with respect to a relevant part of the electric structure associated with the present invention.

FIG. 4 is a block diagram schematically showing the structure of the digital camera 1 according to the present embodiment only with respect to a relevant part of the electric structure associated with the present invention. In the camera body 10 of the digital camera 1, the following are provided: the release button 101; the pitch shake detection gyro 11 and the yaw shake detection gyro 12 as the shake detecting means for detecting a hand shake or the like supplied to the camera 1; circuitry 13 comprising various circuit board blocks; the lens barrel 2 constituting the taking lens system; and the pitch direction motor 3a and the yaw direction motor 3b each comprising the above-described stepping motor that performs the shake compensation driving of the lens barrel 2. Moreover, the circuitry 13 comprises a control target position calculator 14, a sequence control circuit 15, a control circuit 4 (driving pulse generation controller), an integration circuit 5 and a driving circuit 6.

The release button 101 is an operation switch that the user depresses when performing photographing, and when the release button 101 is half depressed, the camera 1 is brought into the photographing preparation state. In such photographing preparation state, the following operates: automatic focusing (AF) to automatically focus the camera 1 on the subject; automatic exposure (AE) to automatically decide the exposure; and the shake compensation function to prevent image disorder due to a hand shake. This shake compensation function continues to operate while the release button 101 is being depressed, in order to facilitate framing. When the release button 101 is fully depressed, photographing is performed. That is, according to the exposure condition decided by the AE, exposure control is performed so that the exposure of the solid-state image sensor is appropriate.

The pitch shake detection gyro 11 is a gyro sensor that detects the shake of the camera 1 in the pitch direction (see FIG. 2), and the yaw shake detection gyro 12 is a gyro sensor that detects the shake of the camera 1 in the yaw direction. The gyro sensor used in this example is for detecting the angular velocity of a shake when the object to be measured (in the present embodiment, the camera body 10) rotates due so the shake. As such a gyro sensor, for example, a type may be used that brings a piezoelectric element into vibrating state by applying a voltage thereto and captures, as an electric signal, the distortion due to the Coriolis force caused when the angular velocity by a rotation is applied to the piezoelectric element, to thereby detect the angular velocity.

The control target position calculator 14 sets the control target information obtained at predetermined sampling periods. That is, the control target position calculator 14 obtains the pitch shake angular velocity signal detected by the pitch shake detection gyro 11 and the yaw shake angular velocity signal detected by the yaw shake detection gyro 12, and sets the control target value (in this case, the position information of the lens barrel 2 which is the object to be driven) in the servo control. The control target position calculator 14 is provided with a shake detection circuit 141, a shake amount detection circuit 142 and a coefficient conversion circuit 143.

The shake detection circuit 141 comprises processing circuits such as filter circuits (a low pass filter and a high pass filter) for reducing noise and drift from the angular velocity signals detected by the pitch shake detection gyro 11 and the yaw shake detection gyro 12 and an amplifier circuit for amplifying the angular velocity signals. The angular velocity signals having undergone the processings by the processing circuits are inputted to the shake amount detection circuit 142.

The shake amount detection circuit 142 captures the detected angular velocity signals at predetermined time intervals, and when the shake amount of the camera 1 in the X axis direction is detx and the shake amount thereof in the Y axis direction is dety, outputs the shake amounts detx and dety to the coefficient conversion circuit 143. Moreover, the coefficient conversion circuit 143 converts the shake amounts (detx, dety) in the directions outputted from the shake amount detection circuit 142 into movement amounts (px, py) in the directions, that is, the movement amounts by which the lens barrel 2 is to be moved by the pitch direction motor 3a and the yaw direction motor 3b. The signals representative of the movement amounts (px, py) in the directions outputted from the coefficient conversion circuit 143 are inputted to the control circuit 4.

The control circuit 4 (driving pulse generation controller) controls the generation of the driving pulse for driving the pitch direction motor 3a and the yaw direction motor 3b each comprising a stepping motor. The control circuit 4 converts the signals representative of the movement amounts (px, py) in the directions into actual driving pulse signals (drvx, drvy) in consideration of the position information from the integration circuit 5 described later, the operation characteristics of the pitch direction motor 3a and the yaw direction motor 3b and the like. That is, the control circuit 4 functions as calculating means for calculating the generation condition of the driving pulse necessary for causing the lens barrel 2 to shake so as to follow the control target value in order to perform the shake compensation control (servo control) to follow the control target value generated by the control target position calculator 14 based on the detection signals from the pitch shake detection gyro 11 and the yaw shake detection gyro 12. This function of the control circuit 4 will be described later in detail.

The integration circuit 5 is provided for performing the open loop control of the pitch direction motor 3a and the yaw direction motor 3b. The integration circuit 5 integrates the number of driving pulses generated by the driving circuit 6 described later, generates the current position information of the stepping motor, that is, the shake position information of the lens barrel 2, and outputs it to the control circuit 4. When the closed loop control is adopted, a position sensor and a conversion circuit that replaces the sensing information from the position sensor with position information are incorporated instead of the integration circuit 5.

The driving circuit 6 is provided with a pulse generating circuit and the like, and generates a driving pulse that actually drives the pitch direction motor 3a and the yaw direction motor 3b. This driving pulse is generated based on the driving pulse generation control signal supplied from the control circuit 4.

The operations of the shake amount detection circuit 142, the coefficient conversion circuit 143 and the control circuit 4 are controlled by the sequence control circuit 15. That is, when the release button 101 is depressed, the sequence control circuit 15 controls the shake amount detection circuit 142 so as to capture a data signal related to the above-mentioned shake amounts (detx, dety) in the directions.

Then, the sequence control circuit 15 controls the coefficient conversion circuit 143 so as to convert the shake amounts in the directions into the movement amounts (px, py) in the directions. Then, the sequence control circuit 15 controls the control circuit 4 so as to calculate the compensation movement amount of the lens barrel 2 based on the movement amounts in the directions at predetermined sampling periods. For the shake prevention control (hand shake compensation) of the lens barrel 2, such an operation is repeated at predetermined time intervals until the release button 101 is fully depressed and exposure is ended.

As the stepping motor constituting the pitch direction motor 3a and the yaw direction motor 3b, a normal small-size stepping motor having a stator core and a rotor core is applicable. It is desirable that a screw rotation shaft be directly connected to the rotor core and a movement piece (nut, etc.) be attached onto the screw rotation shaft in order that the lens barrel 2 can be directly driven for shake prevention. Instead of such a rotary stepping motor, a linear stepping motor where the rotor moves linearly with respect to the stator may be used.

(Detailed Description of the Driving Pulse Generation Controller)

Figure 5:
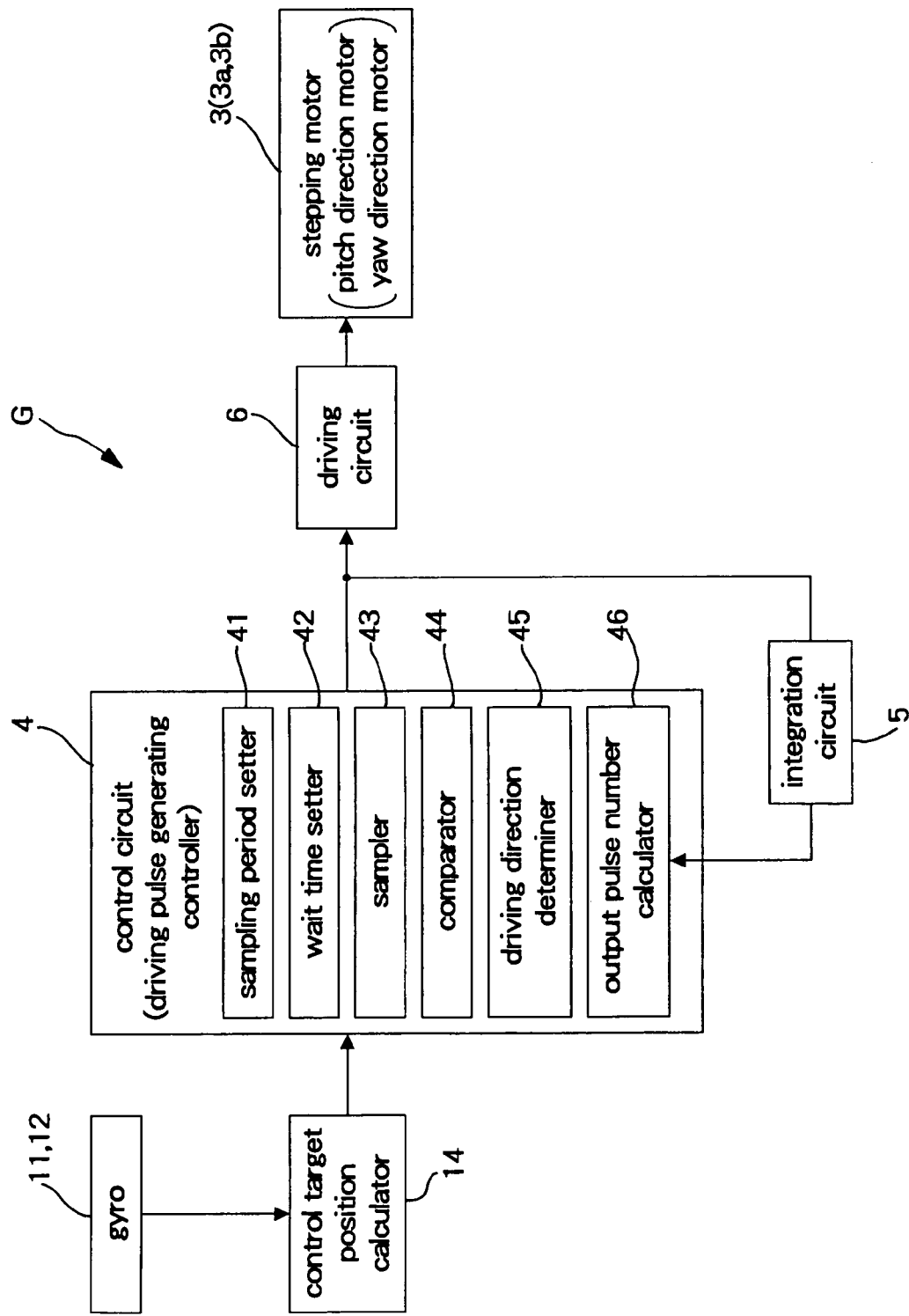
FIG. 5 is a functional block diagram for explaining the function of a driving pulse generation controller (is also a block diagram showing an embodiment of a driving mechanism according to the present invention)

FIG. 5 is a functional block diagram for explaining the function of the control circuit 4 (driving pulse generation controller) (is also a block diagram showing an embodiment of a driving mechanism G according to the present invention). The principal function of the control circuit 4 is to set the generation condition of the driving pulse to drive the pitch direction motor 3a and the yaw direction motor 3b at predetermined sampling periods. The control circuit 4 is provided with a sampling period setter 41, a wait time setter 42, a sampler 43, a comparator 44, a driving direction determiner 45 and an output pulse number calculator 46.

The sampling period setter 41 accepts the setting of the sampling period at which the control target value of the servo control is obtained from the control target position calculator 14. This sampling period may be arbitrarily set, and may be selected as appropriate, for example, from a range of approximately 0.1 ms to 2 ms. While when a short sampling period is set, followability is generally excellent since the control target value is obtained at short periods, an appropriate sampling period is set in consideration of the control calculation power and the stepping motor performance.

In setting the sampling period, when the object to be driven is approximated to a first-order lag system, the setting can be performed in consideration of its natural break frequency f0. The break frequency f0 is a frequency whose characteristic of response to shake and the like changes from a first relationship to a second relationship different from the first relationship. For example, when the shake displacement (output) of the object when a predetermined shake force Zin is inputted to the object is Zout, the point of shift from a shake region (first relationship) where Zin=Zout to a shake region (second relationship) where Zin>Zout or Zin<Zout is the break frequency (the number of shakes) f0. Applying this to the present embodiment, the point at which the response characteristic of the driving of the lens barrel 2 by the pitch direction motor 3a and the yaw direction motor 3b shifts is the break frequency f0.

Figure 6:
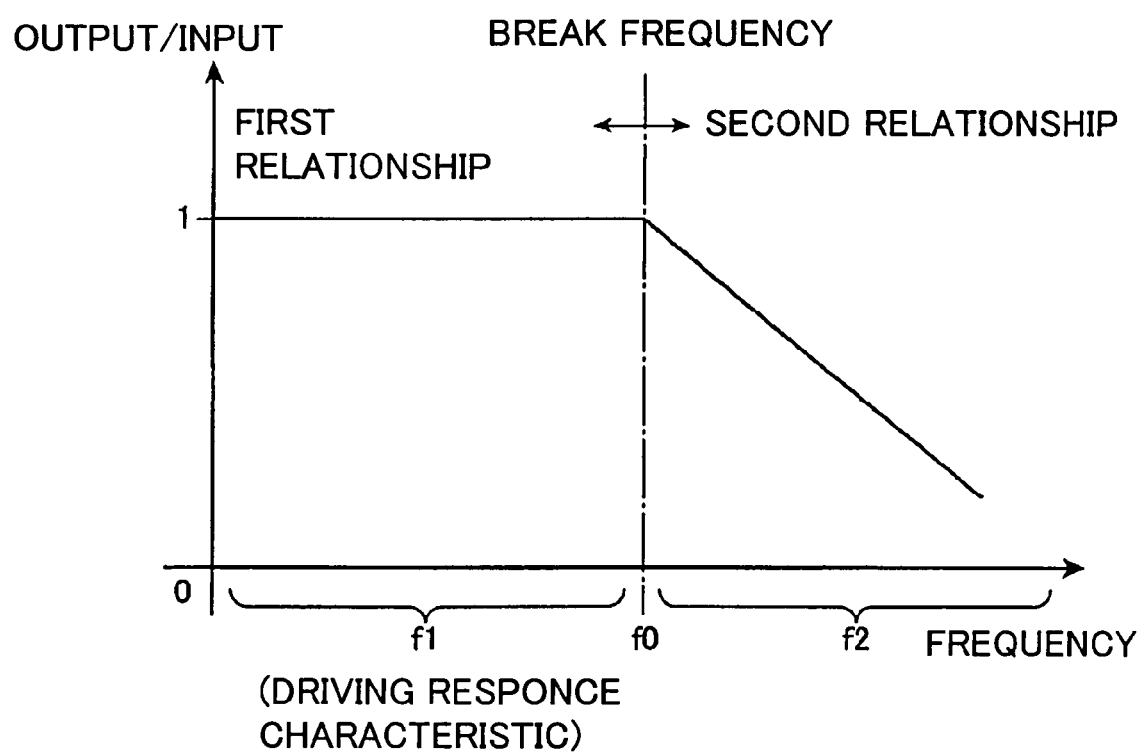
FIG. 6 is a graph showing an example of a driving response characteristic.

FIG. 6 is a graph showing an example of the driving response characteristic. In this case, when the driving force is supplied to the lens barrel 2 at a frequency f1 lower than the break frequency f0, the relationship between the predetermined driving force Zin and the displacement Zout of the lens barrel 2 due to the driving force Zin is Zout/Zin=1, and the lens barrel 2 is shaken in a one-to-one correspondence with the inputted driving force (first relationship). While the speed of the stepping motor can be controlled by changing the pulse rate of the driving pulse, since a response relationship of Zout/Zin=1 is obtained in the first-relationship region, the driving control (speed control) of the lens barrel 2 based on the pulse rate can be performed. Therefore, when the characteristic of the first relationship is utilized, the sampling period is set to a long period of not less than 1/f0. However, when the driving control based on the pulse rate is performed, since it is necessary to execute a calculation to determine the pulse rate at the sampling periods, the driving processing tends to be complicated.

On the other hand, when the driving force is supplied to the lens barrel 2 at a frequency f2 higher than the break frequency f0, the relationship between the predetermined driving force Zin and the displacement Zout of the lens barrel 2 due to the driving force Zin is Zout/Zin<1, and the lens barrel 2 is not shaken in a one-to-one correspondence with the inputted driving force (second relationship). That is, the supplied driving force cannot be caught up with, and the lens barrel 2 is not shaken so as to follow faithfully. In this case, although the driving control of the lens barrel 2 based on the pulse rate cannot be performed, since the lens barrel 2 is driven only by a predetermined amount that can be actually followed irrespective of what kind of driving pulse is inputted, the driving control (speed control) of the lens barrel 2 based only on the number of driving pulses can be performed. Consequently, an advantage is obtained such that the driving processing can be simplified. When the characteristic of the second relationship having such an advantage is utilized, the sampling period is set to a short period of not more than 1/f0.

The wait time setter 42 accepts the setting as to the driving pulse generation interval, specifically, sets the generation interval between the driving pulse generated last in a first sampling period and the driving pulse generated first in a second sampling period succeeding the first sampling period, to a predetermined wait time. That is, the wait time setter 42 deters the occurrence of a loss of synchronization by setting a predetermined wait time so that the interval between the driving pulse generated last in the first sampling period and the driving pulse generated first in the succeeding second sampling period is not abnormally short.

The sampler 43 obtains the target position information for servo control from the control target position calculator 14 at the sampling periods set by the sampling period setter 41. Specifically, the signals representative of the movement amounts (px, py) in the directions outputted from the coefficient conversion circuit 143 are captured at sampling periods.

The comparator 44 compares the current position information of the rotors of the stepping motors (the pitch direction motor 3a and the yaw direction motor 3b) which is the integration value signal outputted from the integration circuit 5, that is, the shake position information of the lens barrel 2 with the target position information obtained by the sampler 43, thereby obtaining the position deviation e therebetween. The lens barrel 2 is shaken by the pitch direction motor 3a and the yaw direction motor 3b so that the position deviation e is as close to zero as possible.

The driving direction determiner 45 determines the rotation directions of the stepping motors based on whether the position deviation e obtained by the comparator 44 is a deviation in the pulse direction or in the minus direction. Moreover, the driving direction determiner 45 generates a control signal for changing the order of power supply to the stator coil to thereby rotate the rotor normally or in reverse based on the result of the determination of the rotation direction.

The output pulse calculator 46 resets the driving pulse generation condition up to that time at the sampling periods in accordance with the position deviation e obtained by the comparator 44, and performs a calculation to determine the generation condition of the driving pulse generated in the sampling interval to the next sampling period (the number of driving pulses). That is, the output pulse number calculator 46 newly sets the stepping motor driving condition at the sampling periods, and in performing the servo control, drives the stepping motors by supplying the most suitable driving pulse thereto at the predetermined sampling periods.

The control signal related to the normal or reverse rotation of the rotor generated by the driving direction determiner 45 and the control signal related to the number of driving pulses generated by the output pulse number calculator 46 are outputted to the driving circuit 6. Receiving such control signals, the driving circuit 6 generates a predetermined driving pulse by a pulse generation circuit, and supplies this to the pitch direction motor 3a and the yaw direction motor 3b to drive them.

(Description of the Operation of the Driving Pulse Generation Controller)

Next, concrete examples of the driving pulse generated by the control circuit 4 (driving pulse generation controller) and the operation will be described.

First Embodiment of the Driving Pulse Generation Control

Figure 7:
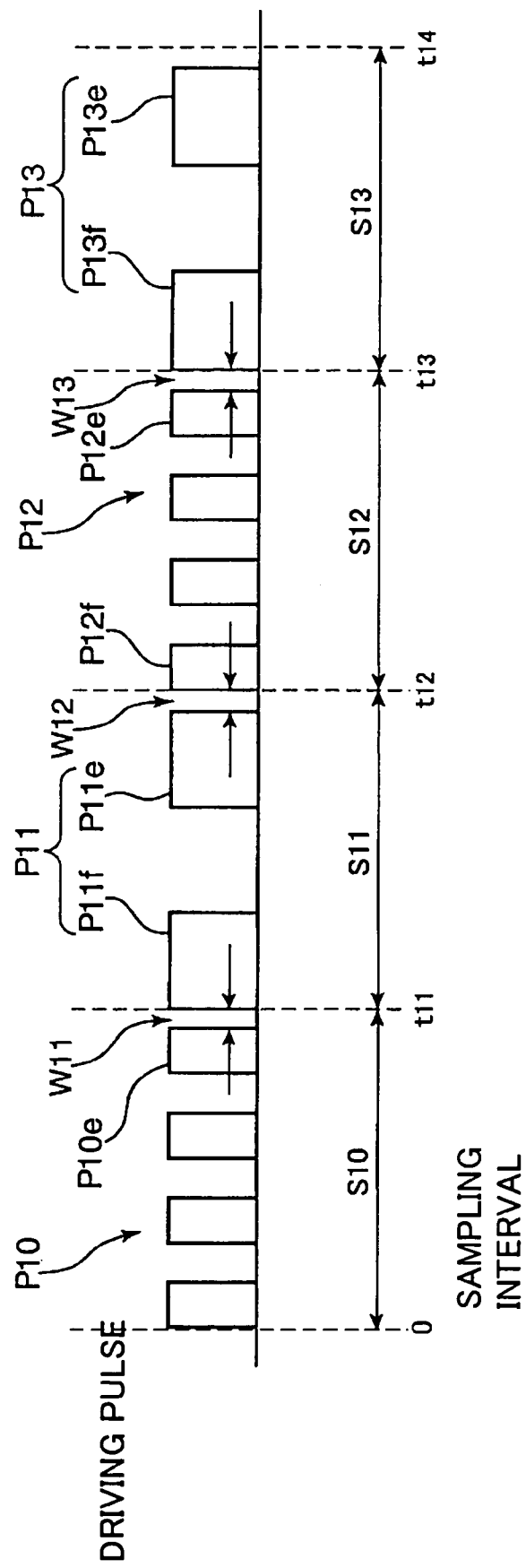
FIG. 7 is a time chart showing an example of driving pulse generation control.

FIG. 7 is a time chart showing the driving pulse generation condition when the speed control is performed without the wait time in each sampling interval being specifically considered and based on the pulse rate of the driving pulse. In this case, since the speed control is performed based on the pulse rate, in the sampling period setter 41, sampling periods t11 to t14 which are long periods of not less than 1/f0 are set in view of the break frequency f0 of the lens barrel 2.

As shown in FIG. 7, in a first sampling interval S10, a driving pulse P10 whose pulse rate is set to a first pulse rate is outputted. When the first sampling period t11 comes, the generation condition of the driving pulse P10 is reset, and the generation condition of a driving pulse P11 generated in a second sampling interval S1 succeeding the first sampling interval S10 is obtained by the control circuit 4. Specifically, the target position information for servo control is obtained from the control target position calculator 14 by the sampler 43, and the position deviation e is obtained by the comparator 44. Then, in order that the position deviation e approaches zero, the generation condition of the driving pulse is obtained by calculation by the driving direction determiner 45 and the output pulse number calculator 46. In this case, the output pulse number calculator 46 devotedly performs a calculation to change the pulse rate in accordance with the magnitude of the position deviation e.

As shown in the figure, the driving pulse P11 of the second sampling interval S1 is low in pulse rate compared to the driving pulse P10, and in this case, the stepping motors are driven at a lower speed than in the first sampling interval S10. Likewise, the generation condition of the driving pulse P11 is reset at the second sampling period t12, the generation condition of a driving pulse P12 generated in a third sampling interval S12 is obtained, the generation condition of the driving pulse P12 is reset at the succeeding third sampling period t13, and the generation condition of a driving pulse P13 generated in a fourth sampling interval S13 is obtained.

By performing such driving pulse generation control, the setting of the driving pulse generation condition in accordance with the obtained control target information is performed at the sampling periods, so that servo control capable of accurately following a given change of the target value can be realized. However, there is apprehension that there are cases where the generation interval W11 between a driving pulse P10e generated last in the first sampling interval S10 and a driving pulse P11f generated first in the succeeding second sampling interval S11 is abruptly decreased, and when the generation interval W11 is not more than a predetermined value, the stepping motors may lose synchronization. This applies to the generation interval W12 between a lastly generated driving pulse P11e in the second sampling interval S11 and a firstly generated driving pulse P12f in the third sampling interval S12, and the generation interval W13 between a lastly generated driving pulse P12e in the third sampling interval S12 and a firstly generated driving pulse P13f in the fourth sampling interval S13.

In this case, when the open loop control is performed, the stepping motors are out of control because of the loss of synchronization. On the other hand, when the closed loop control is performed, although the stepping motors are never out of control, there is still apprehension that the operation at the sampling periods is unstable. Further, in the closed loop control, since a position detection sensor and a feedback control system are necessary, the control structure is complicated and cost is increased, so that the degree of adequacy, for example, for a use of being provided as a hand shake compensation mechanism of a small-size digital camera is reduced.

Second Embodiment of the Driving Pulse Generation Controls

Figure 8:
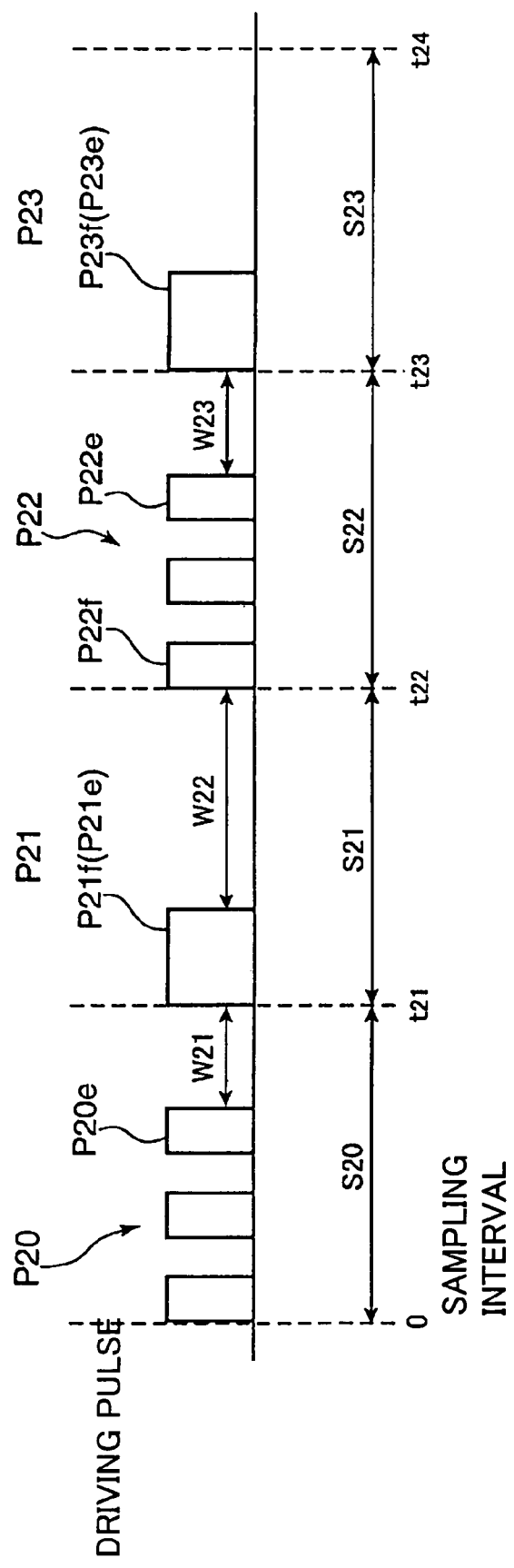
FIG. 8 is a time chart showing an example of the driving pulse generation control.

FIG. 8 is a time chart showing the driving pulse generation condition when, in view of the above-mentioned points, the wait time is set at the sampling intervals and the speed control is performed based on the pulse rate of the driving pulse. In this case, long sampling periods t21 to t24 of not less than 1/f0 are set, and a predetermined wait time is set in the wait time setter 42 of the control circuit 4.

As shown in FIG. 8, in a first sampling interval S20, a driving pulse P20 whose pulse rate is set to a first pulse rate is outputted. When the first sampling period t21 comes, the generation condition of the driving pulse P20 is reset, and the generation condition of a driving pulse P21 generated in a second sampling interval S21 succeeding the first sampling interval S20 is obtained by the control circuit 4. In the example shown in the figure, the driving pulse P21 of the second sampling interval S21 is low in pulse rate compared to the driving pulse P20, and in this case, the stepping motors are driven at a lower speed than in the first sampling interval S20. Such control is similar to the first embodiment.

However, in this second embodiment, since the predetermined wait time is set in the wait time setter 42, the generation interval W21 between a lastly generated driving pulse P20e in the first sampling interval S20 and a firstly generated driving pulse P21f in the second sampling interval S21 is never equal to or smaller than a predetermined value, so that the loss of synchronization can be prevented.

Likewise, the generation condition of the driving pulse P21 is reset at the second sampling period t22, the generation condition of a driving pulse P22 generated in a third sampling interval S22 is obtained, the generation condition of the driving pulse P22 is reset at the succeeding third sampling period t23, and the generation condition of a driving pulse P23 generated in a fourth sampling interval S23 is obtained. Likewise, the generation interval W22 between a lastly generated driving pulse P21e in the second sampling interval S21 and a firstly generated driving pulse P22f in the third sampling interval S22 and the generation interval W23 between a lastly generated driving pulse P22e in the third sampling interval S22 and a firstly generated driving pulse P23f in the fourth sampling interval S23 are never equal to or smaller than the predetermined value by setting the wait time.

Figure 9:
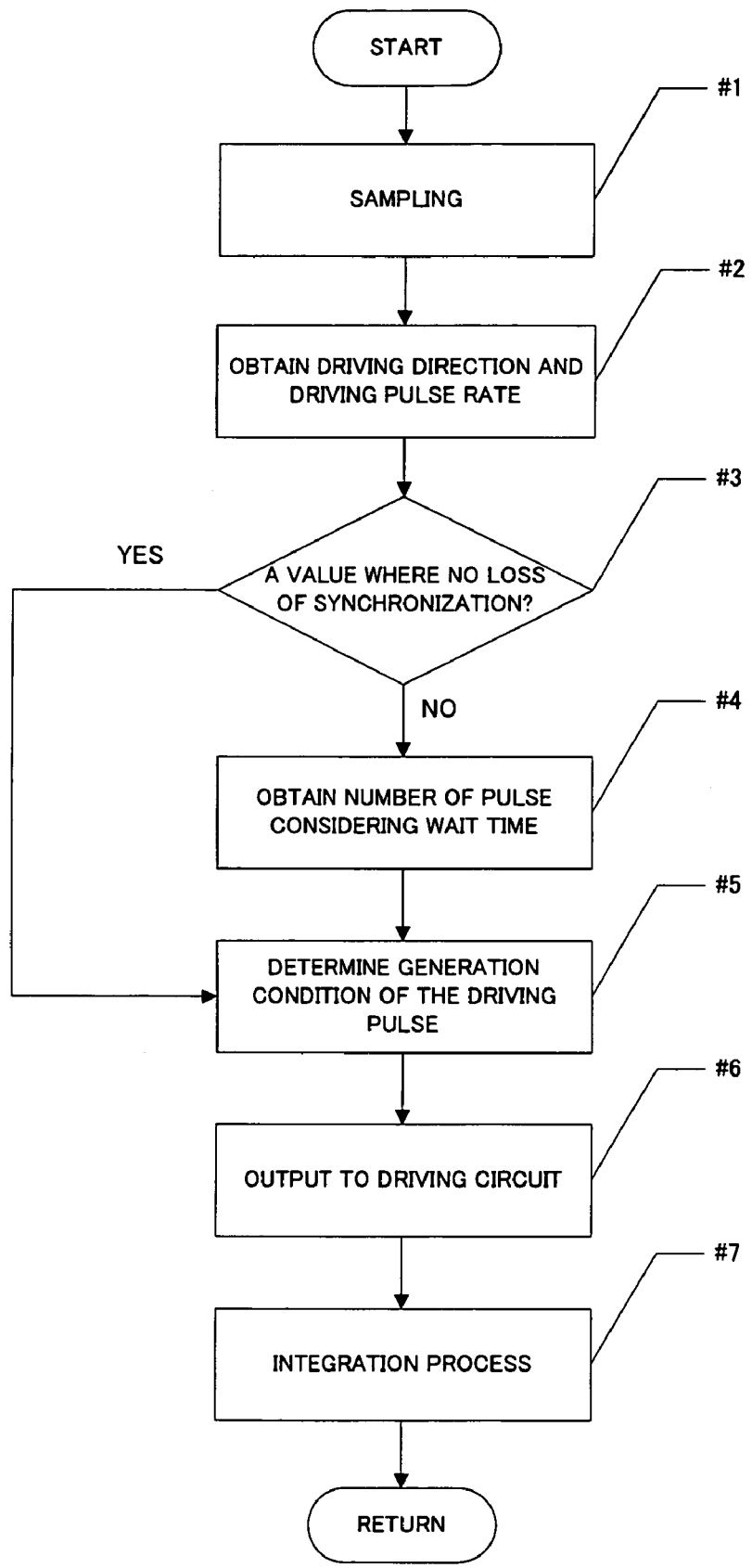
FIG. 9 is a flowchart showing a control sequence of a control circuit when the driving pulse generation control shown in FIG. 8 is performed.

FIG. 9 is a flowchart showing a control sequence of the control circuit 4 (output pulse number calculator 46) when the driving pulse generation control as shown in FIG. 8 is performed. When the control target value is obtained and the position deviation e is obtained (step #1), in order that the position deviation e approaches zero, the driving direction and the driving pulse rate are obtained by calculation by the driving direction determiner 45 and the output pulse number calculator 46 (step #2).

Then, it is determined whether or not the driving pulse rate obtained at step #2 is a value where no loss of synchronization occurs (step #3). Describing this determination step with reference to FIG. 8, it is confirmed whether, for example when the driving pulse P21 of the driving pulse rate obtained at the sampling period t21 is fully outputted in the second sampling interval S21, the generation interval W22 from the firstly generated driving pulse P22f in the next third sampling interval S22 can ensure the predetermined value where no loss of synchronization occurs (is not less than the wait time set in the wait time setter 42) or not.

When there is apprehension that a loss of synchronization occurs as a result of this determination (No of step #3), in order that the predetermined wait time is ensured, the number of driving pulses considering the wait time is obtained by the output pulse number calculator 46 (step #4). The driving pulse rate and the driving pulse number calculated in this manner are determined as the generation condition of the driving pulse generated in the second sampling interval S21 (step #5). When there is no possibility of a loss of synchronization (Yes of step #3), the driving pulse rate (and the number of driving pulses) obtained at step #2 are determined as the driving pulse generation condition.

Then, the control signal related to the driving pulse generation condition determined at step #5 is outputted to the driving circuit 6 from the control circuit 4 (step #6), and the pitch direction motor 3a and the yaw direction motor 3b are driven. Moreover, the processing to add the outputted number of driving pulses to the integration value in the integration circuit 5 is performed (step #7), and one routine is completed.

Third Embodiment of the Driving Pulse Generation Control

In the driving pulse generation control shown in FIG. 8, although a great advantage is obtained that the predetermined wait time is ensured and the problem of the loss of synchronization of the stepping motors can be solved, since a determination as to whether the driving pulse rate calculated at the sampling periods loses synchronization or not is necessary (step #3 of the flowchart shown in FIG. 9), it cannot be denied that the processing is complicated. Moreover, it can be said that the control processing can be made simpler when the driving pulse rate is fixed and the speed control is performed simply based only on the number of driving pulses outputted in each sampling interval than when the speed control is performed while the driving pulse rate is changed.

Figure 10:
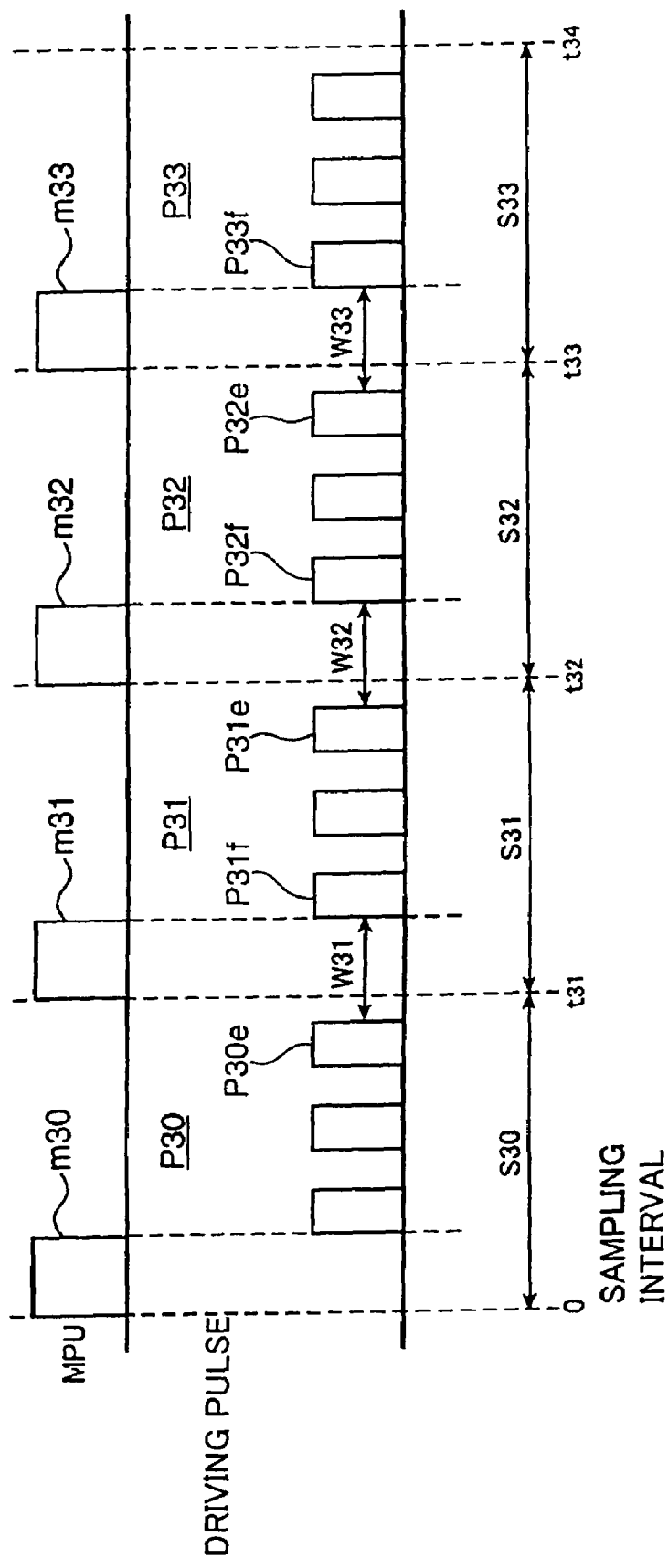
FIG. 10 is a time chart showing an example of the driving pulse generation control.

FIG. 10 is a time chart showing the driving pulse generation condition when, in view of the above-mentioned points, the speed control is performed based only on the number of driving pulses and control considering also the wait time is performed at the sampling intervals. In this case, in order that the driving speed in each sampling interval is determined based on the number of driving pulses, short sampling periods t31 to t34 of not more than 1/f0 (for example, not more than approximately 2 ms) are set in the sampling period setter 41 as described above, and a predetermined wait time is set in the wait time setter 42 of the control circuit 4.

The number of driving pulses generated in the sampling interval is determined according to the required maximum speed and positioning resolution. Since a loss of synchronization occurs when the driving pulse rate is extremely low, a predetermined pulse rate at which no loss of synchronization occurs is selected. Here, when the sampling period is fixed and the driving pulse rate is also fixed, the relationship among the maximum speed, the number of driving pulses and the sampling interval is as follows:

the maximum speed=(the movement amount at the time of one pulse×the number of driving pulses)/the sampling interval.

As is apparent from this relational expression, the maximum speed can be increased by reducing the sampling interval.

Figure 11:
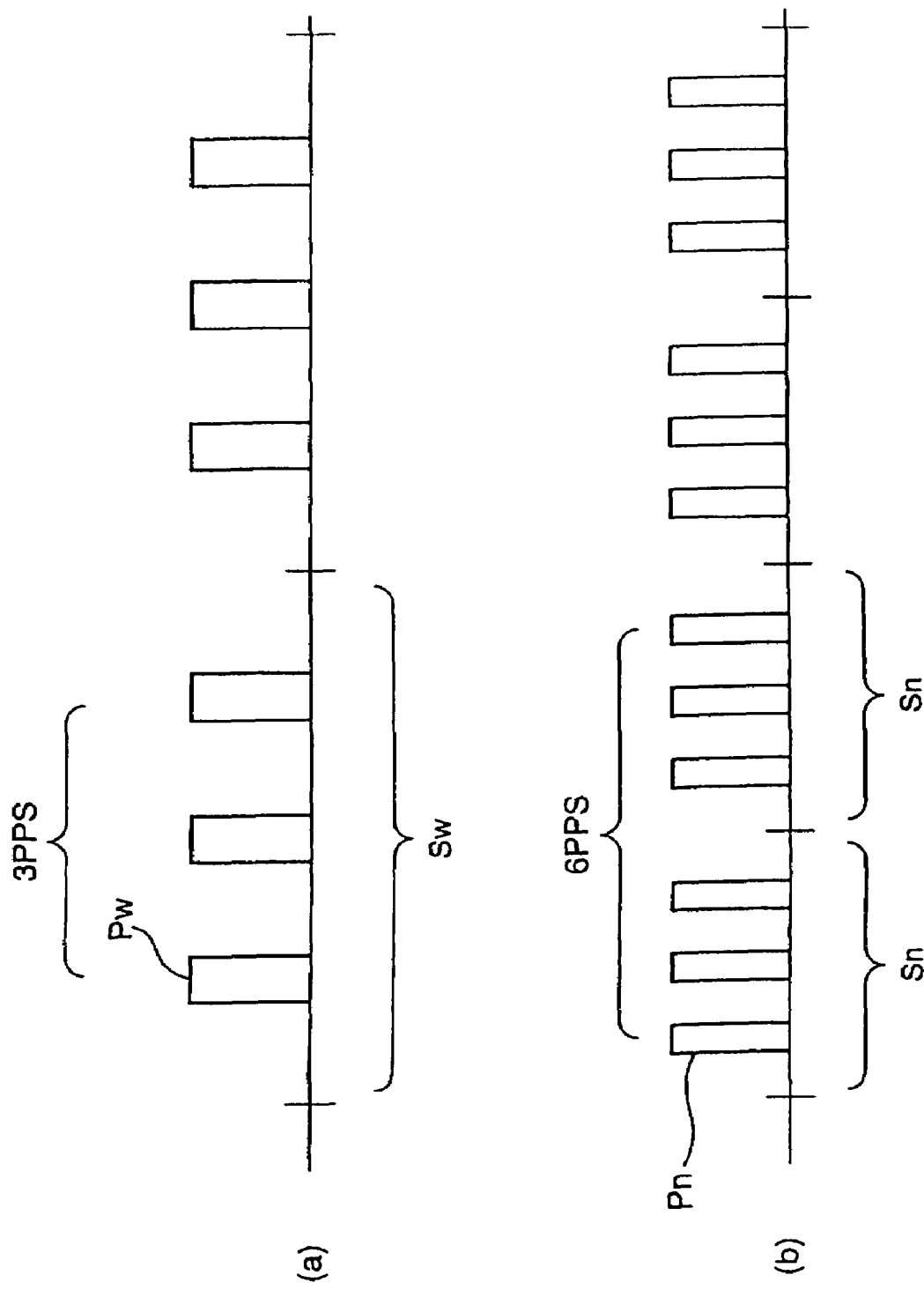
FIGS. 11(a) and 11(b) are views for explaining the relationship between the number of driving pulses and the speed.

This will be described with reference to FIGS. 11(a) and 11(b). Considering now cases where three driving pulses are outputted per sampling interval, in a case where three driving pulses Pw are outputted in one sampling interval Sw as shown in FIG. 11(a), when the sampling interval Sw is the unit time, driving pulses of 3 pps are outputted per unit time. On the other hand, in a case where a sampling interval Sn which is half the sampling interval S2 is set as shown in FIG. 11(b), driving pulses of 6 pps are outputted per unit time. Therefore, by appropriately selecting the length of the sampling interval based on a predetermined driving pulse rate at which no loss of synchronization occurs, the maximum speed can be adjusted.

As shown in FIG. 10, in this driving pulse generation control, the number of driving pulses generated in each sampling interval is fixed (in the shown example, three). In FIG. 10, calculation timings m30 to m33 at which the calculation to determine the driving pulse generation condition is performed by the control circuit 4 are also included in the time chart. In FIG. 10, a driving pulse P30 whose pulse rate is set to a desired one is outputted in a first sampling interval S30. When the first sampling period t31 comes, the generation condition of the driving pulse P30 (in the case of the present embodiment, only the driving direction because the number of driving pulses is fixed) is reset, and the generation condition of a driving pulse P31 generated in the next second sampling interval S31 is obtained by the control circuit 4 (the driving direction determiner 45 that determines the driving direction).

With respect to the number of driving pulses generated in each sampling interval, when the speed has precedence, as many driving pulses as possible are generated, and when the positioning resolution has precedence, a small number of driving pulses are generated. While in the example shown in FIG. 10, the number of driving pulses generated in each sampling interval is fixed to three, for example, a structure may be adopted such that a high-speed mode and a low-speed mode can be set and based on the mode, the output pulse number calculator 46 sets the number of driving pulses according to the mode.

Also in the present embodiment, a predetermined wait time is set in the wait time setter 42. Consequently, the generation interval W31 between a lastly generated driving pulse P30e in the first sampling interval S30 and a firstly generated driving pulse P31f in the second sampling interval S31 is never equal to or smaller than a predetermined value. In other words, since the driving pulse rate is fixed, the output pulse number calculator 46 can perform the setting while previously grasping the number of driving pulses considering the wait time, so that the generation interval W31 where no loss of synchronization of the stepping motors occurs can be ensured. When setting is made such that the driving pulse is fully generated at the pulse rate where no loss of synchronization occurs and except during the wait time in the sampling intervals, driving at the maximum speed can be performed at all times.

Likewise, the generation condition of the driving pulse P31 is reset at the second sampling period t32, the generation condition of a driving pulse P32 generated in a third sampling interval S32 is obtained, the generation condition of the driving pulse P32 is reset at the succeeding third sampling period t33, and the generation condition of a driving pulse P33 generated in a fourth sampling interval S33 is obtained. Likewise, the generation interval W32 between a lastly generated driving pulse P31e in the second sampling interval S31 and a firstly generated driving pulse P32f in the third sampling interval S32 and the generation interval W33 between a lastly generated driving pulse P32e in the third sampling interval S32 and a firstly generated driving pulse P33f in the fourth sampling interval S33 are never equal to or smaller than the predetermined value by setting the wait time.

Calculation timings m31 to m33 are set so that the calculation to determine the driving pulse generation condition by the control circuit 4 is performed in the wait times W31 to W33. In the example shown in FIG. 10, the calculation timings m31 to m33 are set at the beginning of the sampling intervals S31 to S33 so that the wait times W31 to W33 and the calculation timings m31 to m33 overlap each other. When such timing setting is made, since the calculation to determine the driving pulse generation condition is performed by utilizing the wait times W31 to W33 that are unavoidably necessary for preventing the loss of synchronization, the sampling period can be reduced. That is, the driving speed can be increased.

Figure 12:
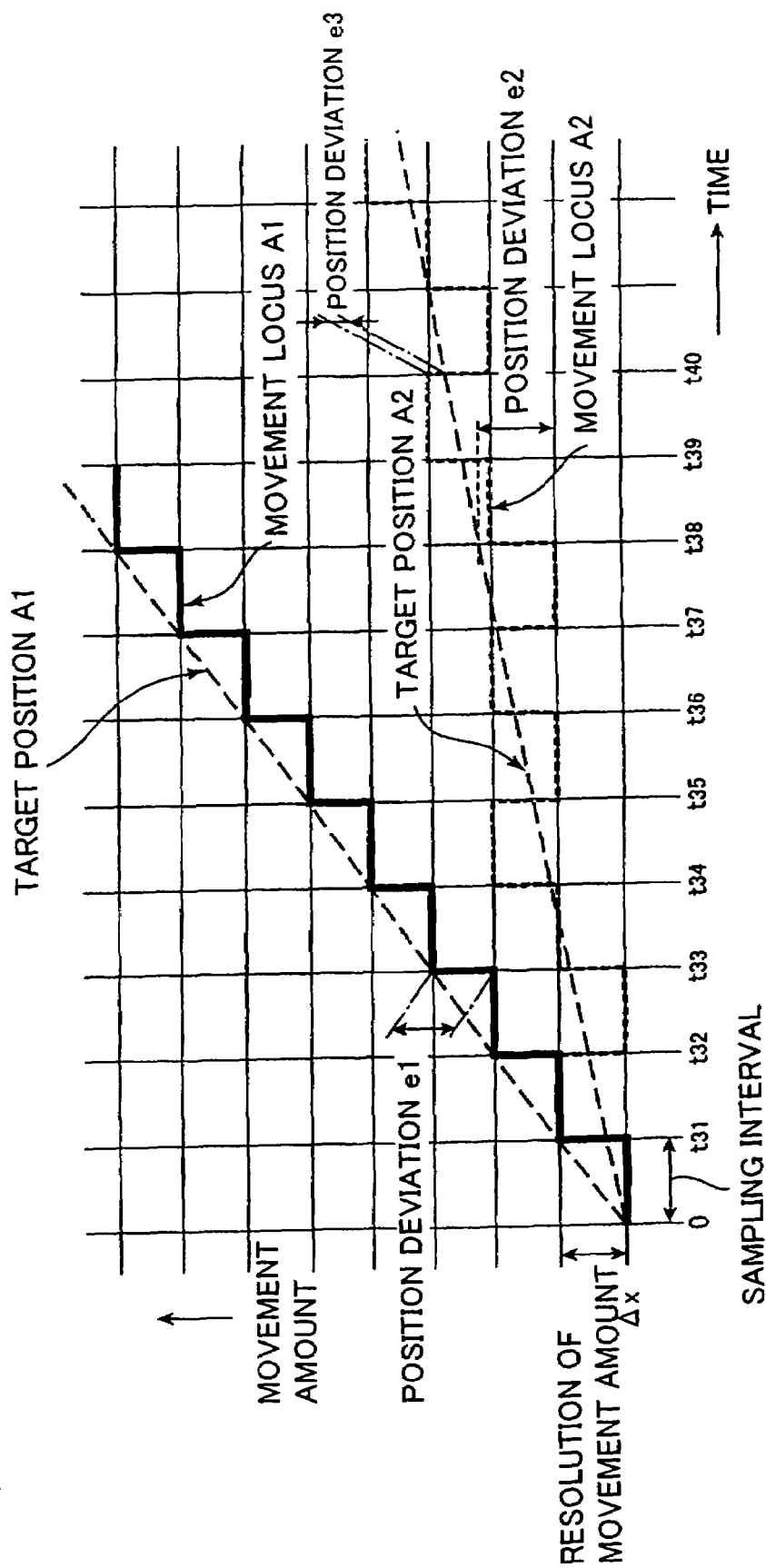
FIG. 12 is a graph schematically showing the relationship between a control target position and a movement locus in the driving pulse generation control method shown in the time chart of FIG. 10.

FIG. 12 is a graph schematically showing the relationship between the control target position and the movement locus in the driving pulse generation control method shown in the time chart of FIG. 10. The positioning resolution Δx shown in the figure is determined based on the movement amount at the time of one pulse×the number of driving pulses. When a target position A1 such that the control target value makes a displacement corresponding to the maximum value of the driving speed is obtained from the control target position calculator 14, since a position deviation e1 at the sampling periods t31 to t38 is always a deviation in the plus direction, the driving direction determiner 45 always performs the determination in the plus direction, and the stepping motors are driven in the plus direction at a constant speed (maximum speed) (movement locus A1).

On the other hand, when a target position A2 such that the control target value makes a displacement of not more than the maximum value of the driving speed is obtained from the control target position calculator 14, the driving direction is changed as appropriate by the driving direction determiner 45 according to the driving status at the sampling periods t31 to t40. Paying attention, for example, to the sampling period t38, since a position deviation e2 at this point of time is a deviation in the plus direction, in order to make up for the position deviation e2, driving is performed by the resolution Δx in the plus direction. Conversely, paying attention to the sampling period t40, since a position deviation e3 at this point of time is a deviation in the minus direction, in order to make up for the position deviation e3, driving is performed by the resolution Δx in the minus direction. That is, in order that the deviation from the target position A2 is as small as possible, a movement locus corresponding to the resolution Δx is drawn while the driving direction determiner 45 is determining the direction (movement locus A2).

It is desirable that the following relationship be held between the resolution Δx of the movement amount and the position deviation e:

the position deviation $e < 2 \cdot \Delta x$.

This is because if the position deviation e is larger than $2 \cdot \Delta x$, the following of the target position cannot be performed even at the maximum speed and servo control is difficult.

According to the driving pulse generation control method of the third embodiment, since the driving speed of the stepping motors is determined based on the number of driving pulses generated in each sampling interval and the stepping motors can be controlled based on the result of the direction determination by the driving direction determiner 45, control can be simplified and the speed of the processing by the control circuit 4 (driving pulse generation controller) can be increased.

Fourth Embodiment of the Driving Pulse Generation Control

Figure 13:
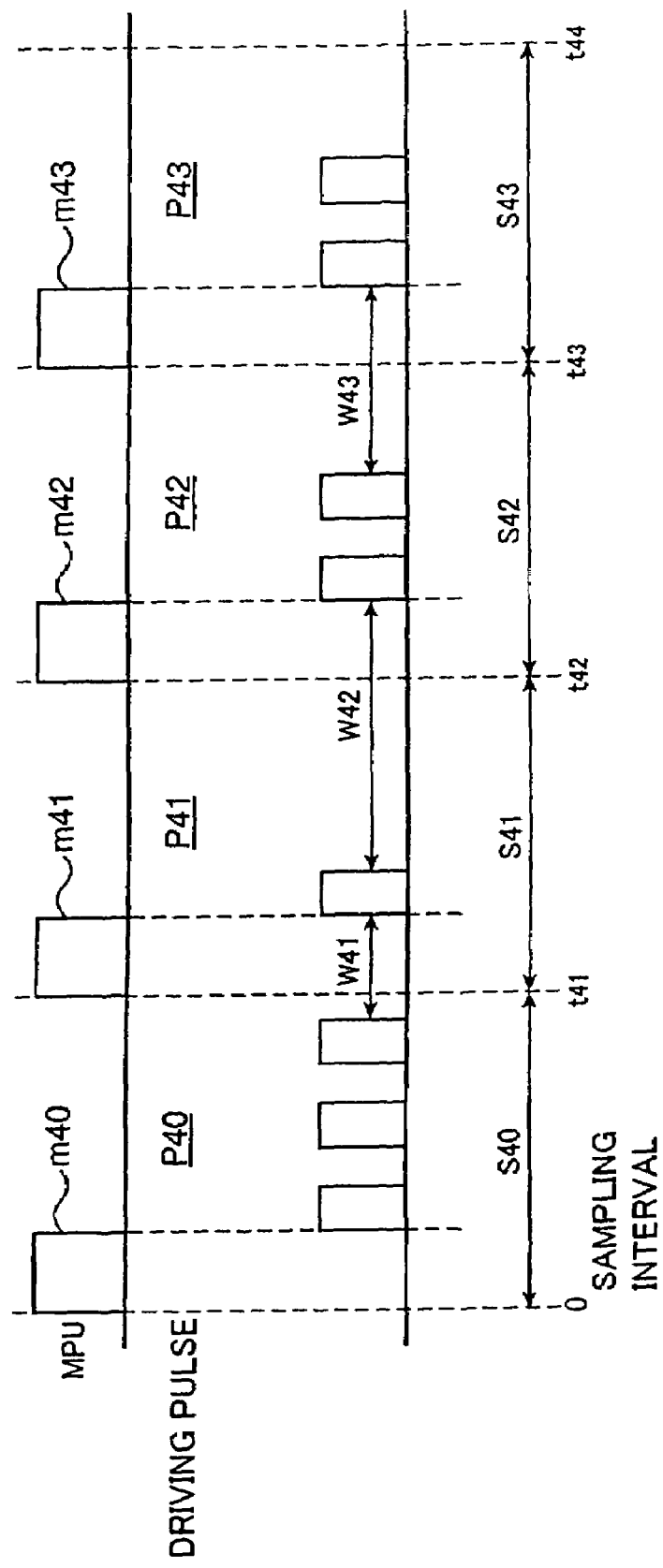
FIG. 13 is a time chart showing an example of the driving pulse generation control.

FIG. 13 is a time chart of the fourth embodiment according to a modification of the driving pulse generation control method of the third embodiment. The fourth embodiment is a driving pulse generation control method in which the driving speed and the positioning resolution can be set according to the control target position at sampling periods t41 to t44.

Also in the fourth embodiment, in order that the driving speed in each sampling interval is determined based on the number of driving pulses, short sampling periods t41 to t44 of not more than 1/f0 (for example, not more than approximately 2 ms) are set in the sampling period setter 41 as described above, and a predetermined wait time is set in the wait time setter 42 of the control circuit 4.

In FIG. 13, a driving pulse P40 whose pulse rate is set to a desired one is outputted in a first sampling interval S40. When the first sampling period t41 comes, the generation condition of the driving pulse P40 (in the case of the present embodiment, the driving direction and the number of driving pulses because the number of driving pulses is variable) is reset, and the generation condition of a driving pulse P41 generated in the next second sampling interval S41 is obtained by the control circuit 4 (the driving direction determiner 45 that determines the driving direction, and the output pulse number calculator 46 that determines the number of driving pulses).

As shown in the figure, the driving pulse P41 in the second sampling interval S41 comprises one driving pulse, and in this case, the stepping motors are driven at a lower speed and higher resolution than in the first sampling interval S10. At the succeeding second sampling period t42, the generation condition of the driving pulse P41 is reset, and the generation condition of a driving pulse P42 generated in a third sampling interval S42 is obtained. The driving pulse P42 in the third sampling interval S42 comprises two driving pulses, and in this case, the stepping motors are driven at a medium speed and medium resolution. Thereafter, similar processing is performed at the third sampling period t43 and succeeding sampling periods. This embodiment is the same as the third embodiment in that wait times W41 to W43 are set in the sampling intervals and that the wait times W41 to W43 and calculation timings m41 to m43 overlap each other.

The driving pulse generation control method according to the fourth embodiment as described above can be said to be a control in which the driving speed and the driving resolution can be set by setting the upper and lower limits of the number of driving pulses generated in the sampling intervals S40 to S43 based on the premise that the sampling period is fixed and the pulse rate of the driving pulse is also fixed. That is, by determining the upper limit of the number of driving pulses according to the desired (or outputtable) maximum speed and determining the lower limit thereof according to the desired resolution, the maximum driving speed is determined by the upper limit of the number of driving pulses and the driving resolution is determined by the lower limit of the number of driving pulses. Consequently, the servo control of the stepping motors can be performed at the sampling periods at an appropriate speed and resolution according to the control target information.

Figure 14:
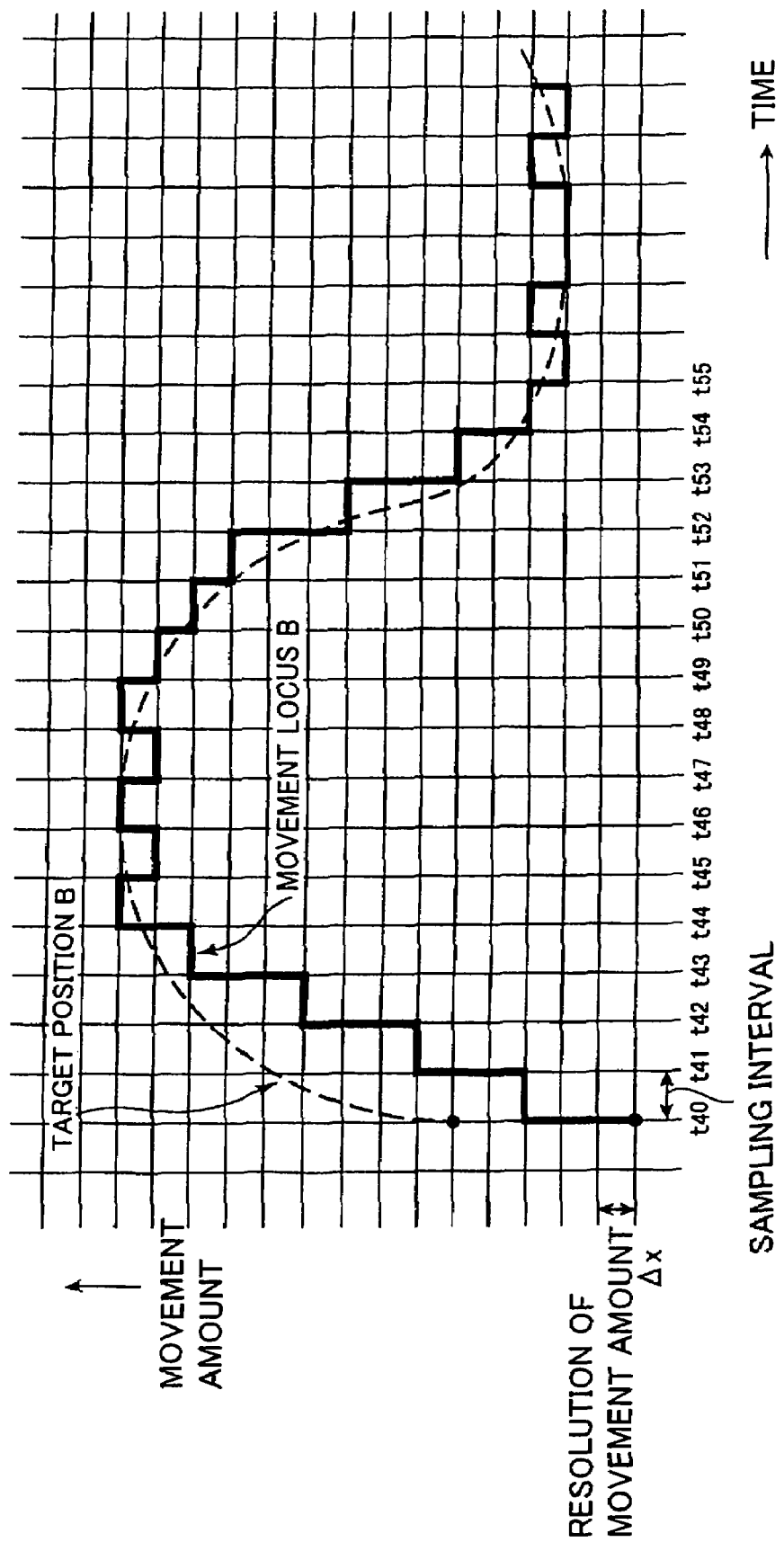
FIG. 14 is a graph schematically showing the relationship between the control target position and the movement locus in the driving pulse generation control method shown in the time chart of FIG. 13.

FIG. 14 is a graph schematically showing the relationship between the control target position and the movement locus in the driving pulse generation control method shown in the time chart of FIG. 13. A case will be considered where a target position B such that the control target value is displaced along a sine curve is obtained from the control target position calculator 14 as shown in the figure. In this case, since the position deviation from the target position B is large in the plus direction from the sampling periods t40 to t43, the driving direction determiner 45 always performs the determination in the plus direction, and in order that the maximum speed is achieved, a control signal to output a large number of driving pulses is generated from the output pulse number calculator 46 (the sampling periods t40 to t43 in FIG. 13 and the sampling periods in FIG. 14 do not coincide with each other).

At the succeeding sampling period t44, since the position deviation is reduced, a control signal to output the number of driving pulses of a medium speed and higher resolution is generated from the output pulse number calculator 46. Further, at the next sampling period t45, since the position deviation is further reduced, a control signal to output the number of driving pulses of a low speed and high resolution is generated from the output pulse number calculator 46 (the driving direction is reversed to the minus direction). In this manner, the servo control is performed while the driving speed and the positioning resolution are adjusted as appropriate according to the degree of separation from the target position B at the sampling periods (movement locus B), so that servo control with excellent target value followability can be realized.

MODIFICATION

Figure 15:
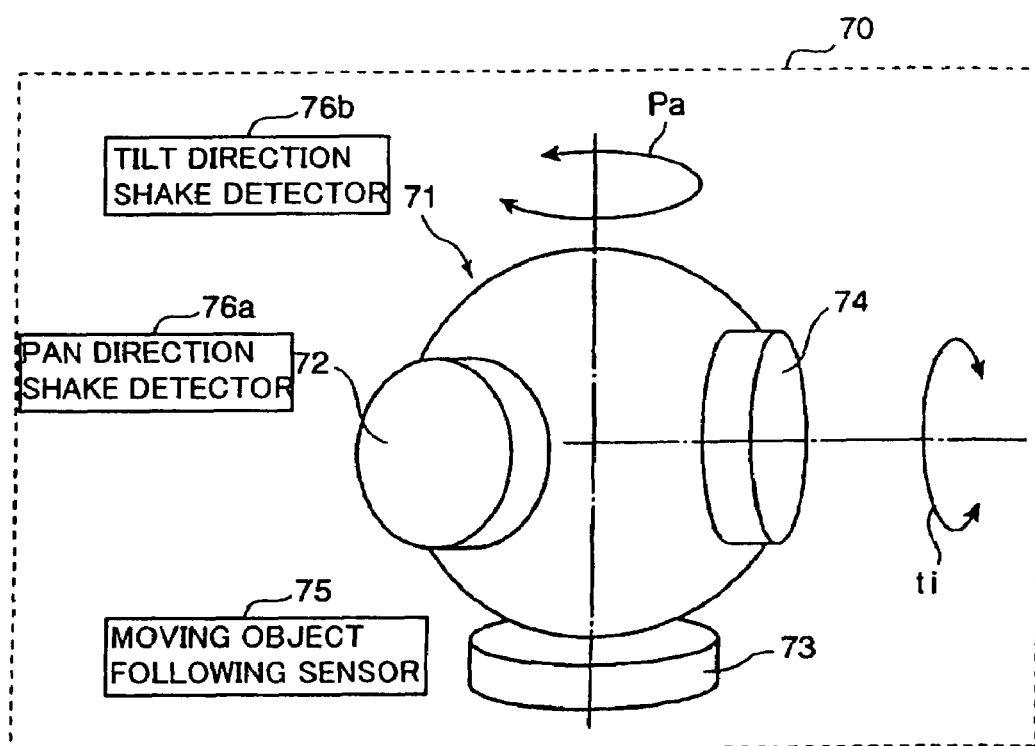
FIG. 15 is a view schematically showing an example of a mobile camera (pan-tilt camera) that performs moving object following photographing according to an embodiment of the present invention.

While cases are described where the driving mechanism (driving method) according to the present invention is applied to the shake compensation mechanism of the digital camera 1, the present invention is applicable to other driving mechanisms. FIG. 15 is a view schematically showing an example of a mobile camera (pan-tilt camera) 70 that performs moving object following photographing. The mobile camera 70 comprises an image capturing apparatus 71 having an image forming portion 72, a pan actuator 73, a tilt actuator 74, a moving object following sensor 75, a pan direction shake detector 76a and a tilt direction shake detector 76b.

The image capturing apparatus 71 has a spherical body having an image sensor inside, and is rotatably supported by the pan actuator 73 and the tilt actuator 74. The image forming portion 72 forms a light image, in the movement direction, of the moving object on the image capturing surface of the image sensor. The pan actuator 73 drives the image capturing apparatus 71 in the pan direction (the direction shown by the arrow Pa of FIG. 15). The tilt actuator 74 drives the image capturing apparatus 71 in the tilt direction (the direction shown by the arrow Ti of FIG. 15). The moving object following sensor 75 senses the movement of the target subject, and obtains its position information. The pan direction shake detector 76a and the tilt direction shake detector 76b detect the accelerations, in the pan and tilt directions, of the mobile camera 70.

Figure 16:
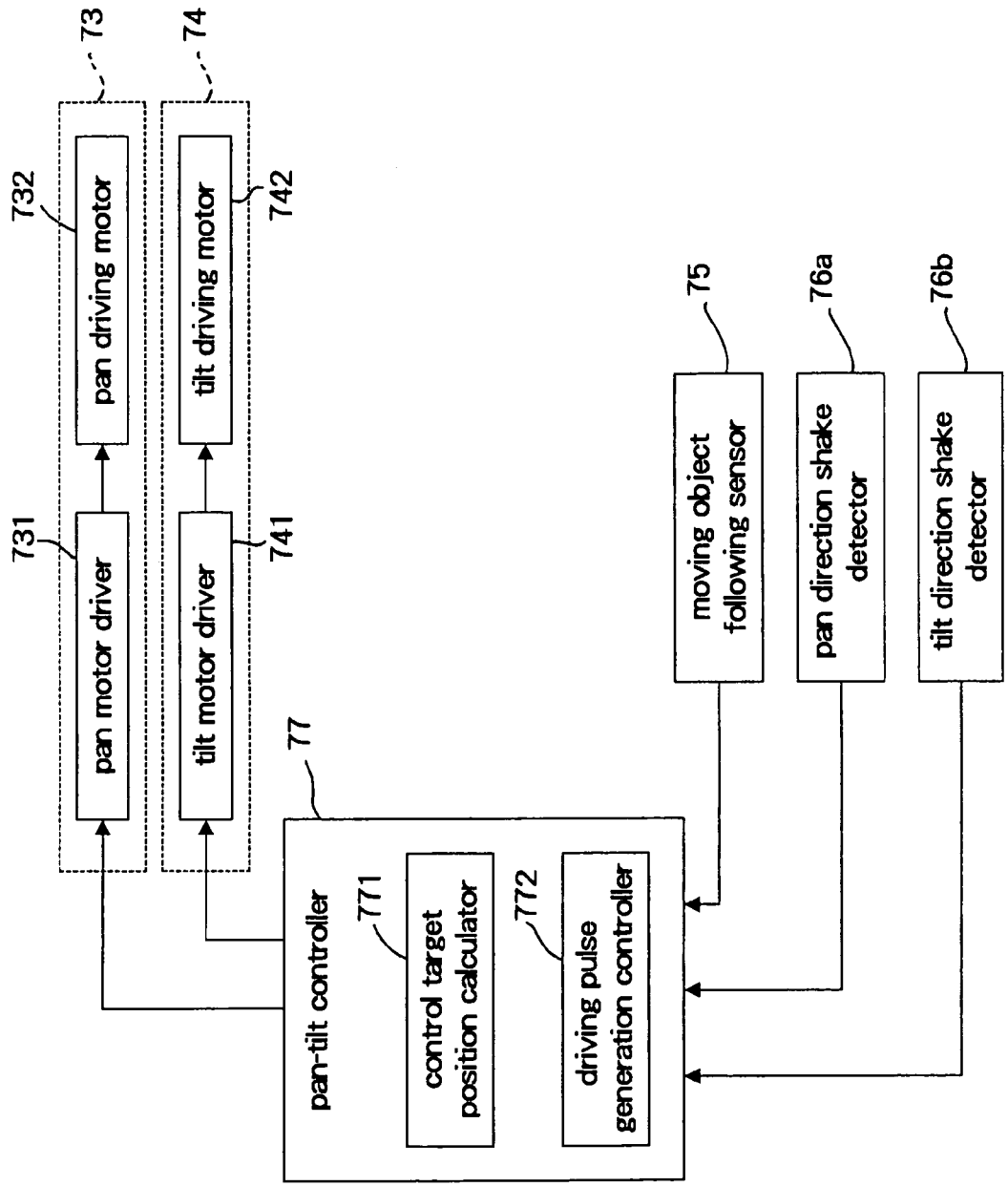
FIG. 16 is a block diagram showing the electric structure of the mobile camera.

FIG. 16 is a block diagram showing the principal electric structure associated with the pan-tilt mechanism of the mobile camera 70. As shown in FIG. 16, the mobile camera 70 is provided with a pan-tilt controller 77 in addition to the structure shown in FIG. 15. The pan actuator 73 comprises a pan motor driver 731 and a pan driving motor 732, and the tilt actuator 74 comprises a tilt motor driver 741 and a tilt driving motor 742. In such a structure, stepping motors are used as the pan driving motor 732 and the tilt driving motor 742.

The pan-tilt controller 77 is provided with a control target position calculator 771 and a driving pulse generation controller 772. As the control target position calculator 771, the structure of the control target position calculator 14 described with reference to FIGS. 4 and 5 can be adopted. Likewise, as the driving pulse generation controller 772, the control circuit 4 described with reference to FIGS. 4 and 5 can be used. Therefore, description of these functions is omitted.

In such a structure, at the time of moving object following photographing, the moving object following sensor 75 detects the movement of the target subject as position information, and outputs the detection signal to the control target position calculator 771 of the pan-tilt controller 77. The pan direction shake detector 76a detects the acceleration, in the pan direction, of the mobile camera 70, and the tilt direction shake detector 76b detects the acceleration, in the tilt direction, of the mobile camera 70. The detection acceleration signals are outputted to the control target value calculator 771 of the pan-tilt controller 77.

The control target position calculator 771 sets the control target value for performing the servo control of the stepping motors constituting the pan driving motor 732 and the tilt driving motor 742 according to the position information of the subject and the accelerations in the pan and tilt directions. That is, a control target value is set such that the movement of the subject is followed while the shake of the mobile camera 70 is compensated for.

The driving pulse generation controller 772 samples the control target value at predetermined sampling periods, and performs the driving pulse generation control as illustrated in FIG. 7, 8, 10 or 13. The control signal generated by the driving pulse generation controller 772 is outputted to the pan motor driver 731 and the tilt motor driver 741, and a driving pulse to actually drive the pan driving motor 732 and the tilt driving motor 742 is generated by the pan motor driver 731 and the tilt motor driver 741.

By the pan driving motor 732 and the tilt driving motor 742 driven in this manner, the image capturing apparatus 100 is rotated in the pan direction Pa and the tilt direction Ti so as to follow the subject. In this case, even if a shake is supplied to the mobile camera 70, since a control target value where shake compensation is made is set based on the detection signals of the pan direction detector 76a and the tilt direction shake detector 76b, image capturing can be performed with the image shake being suppressed.

While embodiments in which the driving mechanism (driving method) according to the present invention is applied to the hand shake compensation mechanism and the like of the image capturing apparatus are shown, the driving mechanism according to the present invention is applicable to other driving systems of the image capturing apparatus such as a zoom system and a diaphragm mechanism. However, the application to the hand shake compensation mechanism is particularly preferable because size reduction and cost reduction of the digital camera can be coped with by capitalizing on various advantages of the stepping motor, that is, an advantage that since the open loop control is possible, the position sensor and the feedback control system are unnecessary and the control structure can be simplified. The object to be shaken by the hand shake compensation mechanism may be the lens barrel like in the above-described embodiments or may be the image sensor. Moreover, the lens barrel to be driven is not limited to the bent-type, but may be a collapsible lens barrel.

The driving mechanism (driving method) according to the present invention is also applicable to various electric apparatuses other than the image capturing apparatus, machines and various servo control driving systems such as optical devices. For example, the driving mechanism according to the present invention is applicable to various robot apparatuses, measurement apparatuses and valve operation apparatuses.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A driving mechanism, comprising:
   a stepping motor driven by a predetermined driving pulse; and
   a driving pulse generation controller that controls a generation condition of the driving pulse,
   wherein a predetermined sampling period is set in the driving pulse generation controller, and the driving pulse generation controller resets the driving pulse generation condition at each of a plurality of the sampling periods and performs a calculation to determine the driving pulse generation condition in a sampling interval up to the next sampling period.

2. A driving mechanism as claimed in claim 1, further comprising:
   a control information setter that sets a control target information of the stepping motor;
   wherein the driving pulse generation controller obtains the control target information from the control information setter at the sampling periods and performs the calculation to determine the driving pulse generation condition in the sampling interval according to the obtained control target information.

3. A driving mechanism as claimed in claim 2, wherein the control target information set by the control information setter is a position information of an object to be driven by the stepping motor and the driving pulse generation controller controls a movement distance, per unit time, of the object to be driven.

4. A driving mechanism as claimed in claim 1, further comprising:

a wait time setter for setting a generation interval of the driving pulse to be set to a predetermined interval, wherein the wait time setter sets the generation interval between the driving pulse generated last in a first sampling interval and the driving pulse generated first in a second sampling interval succeeding the first sampling interval to a predetermined wait time.

5. A driving mechanism as claimed in claim 4, wherein the calculation to determine the driving pulse generation condition by the driving pulse generation controller is performed within the wait time.

6. A driving mechanism as claimed in claim 1, wherein the sampling period is fixed and the driving pulse generation controller obtains a number of driving pulses generated in each sampling interval by calculation and outputs the calculated number.

7. A driving mechanism as claimed in claim 1, wherein the sampling period and a pulse rate of the driving pulse are fixed and the driving pulse generation controller sets a driving speed and a driving resolution by setting upper and lower limits of the number of driving pulses generated in each sampling interval.

8. A driving mechanism as claimed in claim 1, wherein the sampling period is set to a short period of not more than $1/f0$ when an object to be driven by the driving mechanism is approximated to a first-order lag system and has a natural break frequency $f0$).

9. An image capturing apparatus, comprising:

an image capturing device for performing image capturing of the subject;

a shake compensating device having a predetermined driving mechanism and performing mechanical shake compensation in the image capturing by the image capturing device; and a control target position calculator that calculates a driving target position by the shake compensating device based on a shake amount detected by a predetermined shake detecting device, wherein the driving mechanism of the shake compensating device has a stepping motor driven by a predetermined driving pulse and a driving pulse generation controller that controls a generation condition of the driving pulse, wherein a predetermined sampling period is set in the driving pulse generation controller, and the driving pulse generation controller resets the driving pulse generation condition at each of a plurality of the sampling periods and performs a calculation to determine the driving pulse generation condition in a sampling interval up to the next sampling period.

10. An image capturing apparatus as claimed in claim 9, wherein the sampling period is set to a short period of not more than $1/f0$ when a natural break frequency, when the image capturing apparatus body is approximated to a first-order lag system, is $f0$.

* * * * *

UNITED STATES PATENT AND TRADEMARK OFFICE
CERTIFICATE OF CORRECTION

| | |
|---|---|
| PATENT NO. | : 7,208,905 B2 |
| APPLICATION NO. | : 11/257934 |
| DATED | : April 24, 2007 |
| INVENTOR(S) | : Kazuhiro Shibatani |

It is certified that error appears in the above-identified patent and that said Letters Patent is hereby corrected as shown below:

On the Title Page

In column 1, item (75), delete "Sakai" and substitute --Sakai-shi-- in its place.

In the Claims

Column 22, in claim 8, line 3, after "break frequency" delete "f0)" and substitute --f0-- in its place.

Signed and Sealed this

Thirtieth Day of October, 2007

JON W. DUDAS
*Director of the United States Patent and Trademark Office*